US011120277B2

(12) United States Patent
Okada et al.

(10) Patent No.: US 11,120,277 B2
(45) Date of Patent: Sep. 14, 2021

(54) APPARATUS AND METHOD FOR RECOGNIZING ROAD SHAPES

(71) Applicant: DENSO CORPORATION, Kariya (JP)

(72) Inventors: Masaya Okada, Nisshin (JP); Takumi Uematsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/595,915

(22) Filed: Oct. 8, 2019

(65) Prior Publication Data
US 2020/0117921 A1 Apr. 16, 2020

(30) Foreign Application Priority Data

Oct. 10, 2018 (JP) .............................. JP2018-191643
Nov. 29, 2018 (JP) .............................. JP2018-223645

(51) Int. Cl.
*G06K 9/00* (2006.01)

(52) U.S. Cl.
CPC ................................ G06K 9/00798 (2013.01)

(58) Field of Classification Search
CPC ........... G06K 9/00798; G06K 9/00369; G06K 9/00818; G06T 7/50; G06T 7/70
See application file for complete search history.

(56) References Cited

U.S. PATENT DOCUMENTS

| 2002/0042668 | A1 | 4/2002 | Shirato et al. |
| 2012/0148094 | A1* | 6/2012 | Huang ............... G06K 9/00785 382/103 |
| 2015/0166062 | A1* | 6/2015 | Johnson ................ B60W 10/20 701/41 |
| 2015/0285614 | A1 | 10/2015 | Okada et al. |
| 2016/0012283 | A1* | 1/2016 | Mitoma ..................... B60R 1/00 382/103 |
| 2016/0304120 | A1 | 10/2016 | Okada et al. |
| 2016/0318523 | A1* | 11/2016 | Kim ..................... F02N 11/0837 |
| 2017/0003134 | A1* | 1/2017 | Kim .................... G08G 1/09626 |
| 2017/0153639 | A1* | 6/2017 | Stein .................. G06K 9/00805 |
| 2017/0327118 | A1 | 11/2017 | Masui et al. |

(Continued)

FOREIGN PATENT DOCUMENTS

| JP | 2002-109695 A | 4/2002 |
| JP | 2004-322916 A | 11/2004 |

(Continued)

*Primary Examiner* — Md K Talukder
(74) *Attorney, Agent, or Firm* — Maschoff Brennan

(57) ABSTRACT

In an apparatus for recognizing a road shape of a travel route of a first vehicle, a surrounding environment recognizer repeatedly recognizes, as surroundings information, at least shapes of roadside objects or travel histories of second vehicles that are vehicles other than the first vehicle, located around the first vehicle in a travel direction of the first vehicle. A sequence-of-point estimator repeatedly estimates, using the surroundings information, a reference line connecting a sequence of points that represent the road shape of the travel route in the travel direction of the first vehicle. A first lane boundary setter repeatedly sets a first lane boundary that is a boundary of a lane of the first vehicle, located at a first distance from the reference line to a respective one of the left and the right of the first vehicle in a vehicle-widthwise direction of the first vehicle.

17 Claims, 35 Drawing Sheets

(56) References Cited

U.S. PATENT DOCUMENTS

| | | | |
|---|---|---|---|
| 2017/0337435 A1* | 11/2017 | Uliyar | G08G 1/0129 |
| 2018/0001894 A1 | 1/2018 | Masui et al. | |
| 2018/0005384 A1* | 1/2018 | Ding | G06T 7/215 |
| 2018/0054604 A1* | 2/2018 | Boyd | B64D 47/08 |
| 2018/0229770 A1* | 8/2018 | Kataoka | B62D 15/029 |
| 2018/0253975 A1* | 9/2018 | Mizutani | B60W 30/16 |
| 2020/0001867 A1* | 1/2020 | Mizutani | G08G 1/167 |
| 2020/0043344 A1* | 2/2020 | Shimizu | G08G 1/00 |
| 2020/0117921 A1* | 4/2020 | Okada | G06K 9/00798 |
| 2020/0143175 A1* | 5/2020 | Tan | G06T 7/70 |
| 2020/0160699 A1* | 5/2020 | Annapureddy | G06K 9/628 |
| 2020/0225678 A1* | 7/2020 | Lee | G05D 1/0219 |
| 2020/0293796 A1* | 9/2020 | Sajjadi Mohammadabadi | G06K 9/3233 |
| 2020/0377088 A1* | 12/2020 | Fukushige | G01C 21/3407 |

FOREIGN PATENT DOCUMENTS

| | | |
|---|---|---|
| JP | 2010-191661 A | 9/2010 |
| JP | 2011-043907 A | 3/2011 |
| JP | 2015-199423 A | 11/2015 |
| JP | 2016-101889 A | 6/2016 |
| JP | 2016-134093 A | 7/2016 |
| JP | 2016-199196 A | 12/2016 |

* cited by examiner

<COMPARATIVE EXAMPLE>

APPARATUS AND METHOD FOR RECOGNIZING ROAD SHAPES

CROSS-REFERENCE TO RELATED APPLICATION

This application is based on and claims the benefit of priority from earlier Japanese Patent Application No. 2018-223645 filed on Nov. 29, 2018 and No. 2018-191643 filed on Oct. 10, 2018, the description of which is incorporated herein by reference.

BACKGROUND

Technical Field

This disclosure relates to an apparatus and a method for recognizing road shapes.

Related Art

A road shape recognition apparatus is known that sets boundaries of a lane in which a vehicle carrying the apparatus (also referred to as an own vehicle in this specification) is traveling from edge points of lane divider lines on a road recognized by a camera mounted to the apparatus. The lane boundaries may be used to determine whether or not another vehicle is making a lane change to the lane in which the own vehicle is traveling.

DESCRIPTION OF SPECIFIC EMBODIMENTS

Figure 1:
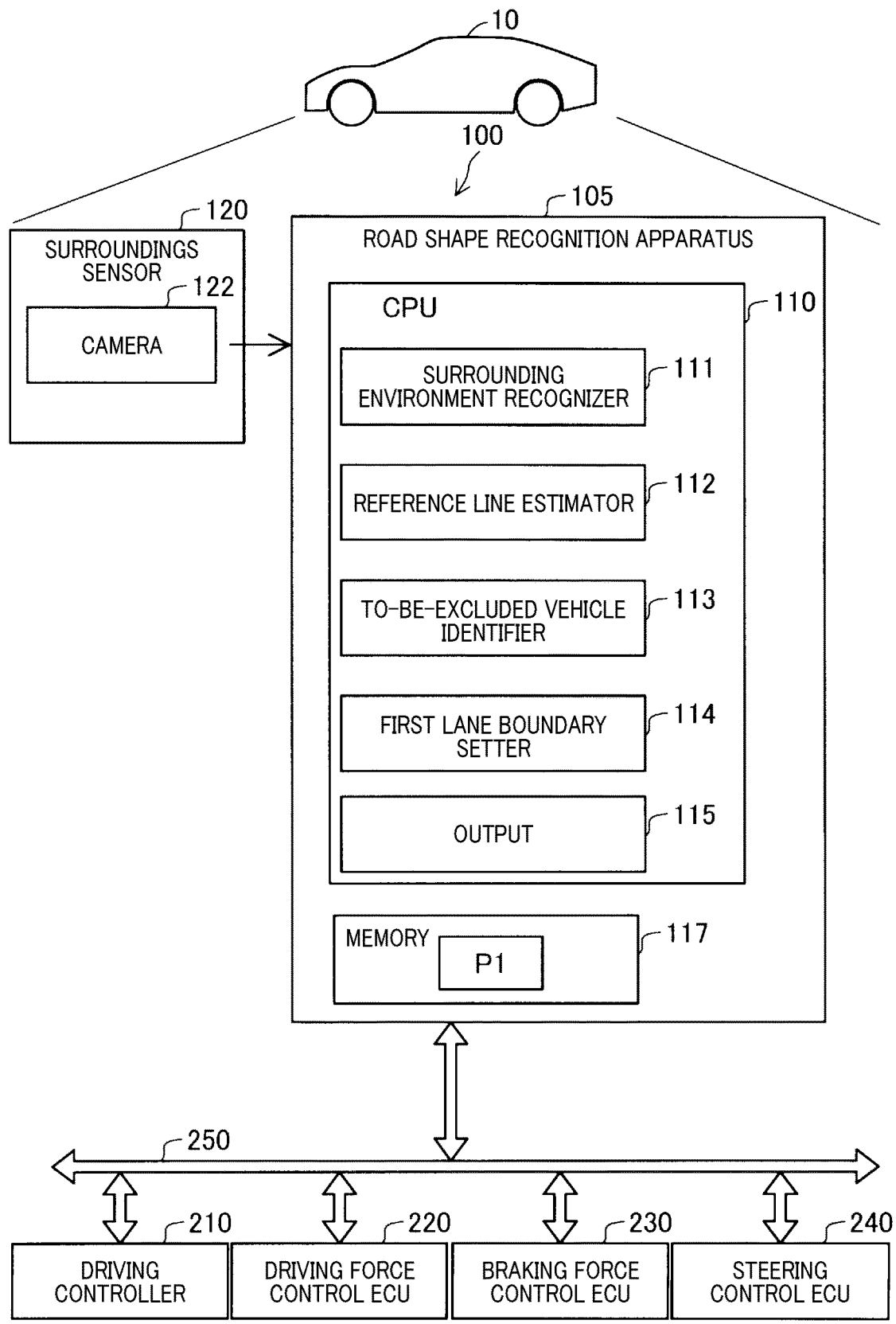
FIG. 1 is a schematic block diagram of an automatic driving control system.

A technique for setting boundaries of a lane in which the own vehicle is travelling, as disclosed in JP-A-2016-134093, does not take into account cases where lane divider lines on a road fail to be recognized using a camera mounted to the own vehicle due to their blurring. In view of the foregoing, it is desired to have a technique for accurately setting lane boundaries even in cases where lane divider lines fail to be recognized.

Hereinafter, exemplary embodiments of the present disclosure will be described in detail with reference to the accompanying drawings, in which like reference numerals refer to like or similar elements and duplicated description thereof will be omitted.

A1. First Embodiment

Referring to FIG. 1, in a first embodiment, a vehicle 10 is equipped with an automatic driving control system 100. In the present embodiment, the automatic driving control system 100 includes a road shape recognition apparatus 105, a surroundings sensor 120, a driving controller 210, a driving force control ECU 220, a braking force control ECU 230, a steering control ECU 240. The word "ECU" stands for an electronic control unit. The road shape recognition apparatus 105, the driving controller 210, the driving force control ECU 220, the braking force control ECU 230, and the steering control ECU 240 are connected to each other via an in-vehicle network 250. The vehicle 10 is also referred to as an own vehicle. In the present embodiment, the automatic driving control system 100 implements automatic driving of the vehicle 10. A driver can manually drive the vehicle 10.

In the specification, the term "first vehicle" is used herein to denote the own vehicle, and the term "second vehicle(s)" are used herein to denote a vehicle(s) other than the first vehicle.

The surroundings sensor 120 mounted to the vehicle 10 includes cameras 122 to repeatedly detect information about surroundings of the vehicle 10 in at least the travel direction of the vehicle 10. In the present embodiment, the cameras 122 include a front view camera, side view cameras, and a rear view camera to capture front view images, side view images, and rear view images. The side view images include images in the vehicle-widthwise or transverse direction of the vehicle 10. The rear view images include not only rear view images, but also left rear view images and right rear view images. Monocular cameras may be used as the cameras 122. Stereo cameras or multiple cameras may also be used as the cameras 122.

The surroundings sensor 120 of the present embodiment further includes a sensor (not shown, but corresponding to a surrounding object sensor 124 of a first modification to the first embodiment described later) to monitor surroundings of the vehicle 10 and a sensor (not shown, but corresponding to a vehicle state sensor 126 of the first modification to the first embodiment described later) to monitor a driving state of the vehicle 10, and an information communication device using vehicle-to-everything (V2X). The sensor to monitor surroundings of the vehicle 10 includes object sensors utilizing reflected waves, such as a millimeter-wave radar, light detection and ranging or laser imaging detection and ranging (LiDAR), an ultrasonic sensor or the like. The sensor to monitor a driving state of the vehicle 10 may include a vehicle speed sensor, an acceleration sensor, a global navigation satellite system (GNSS) sensor, a yaw rate sensor or the like. The vehicle speed sensor is configured to detect a travel speed of the vehicle 10. The acceleration sensor is configured to detect an acceleration of the vehicle 10. The yaw rate sensor is configured to detect a yaw rate of the vehicle 10. The GNSS sensor is formed of a global positioning system (GPS) sensor and detects a current location of the vehicle 10 based on radio waves received from the navigation satellites. The information communication device using the V2X can exchange information about a status of the vehicle 10 and surroundings of the vehicle 10 with the second vehicles via wireless communications with intelligent transport systems, vehicle-to-vehicle communications with the second vehicles, and vehicle-to-infrastructure communications with roadside wireless equipment installed in road equipment. Each sensor included in the surroundings sensor 120 includes an electronic control unit (ECU) to process a result of detection by the sensor. The surroundings sensor 120 can detect various information.

The road shape recognition apparatus 105 includes, as functional blocks, a surrounding environment recognizer 111, a reference line estimator 112, and a first lane boundary setter 114. In the present embodiment, the road shape recognition apparatus 105 further includes, as functional blocks, a to-be-excluded vehicle identifier 113 and an output 115. The to-be-excluded vehicle identifier 113 will be described later in the first modification to the first embodiment. The road shape recognition apparatus 105 may be configured as a microcomputer including a central processing unit (CPU) 110, a memory 117, and an interface (not shown). Functions of these functional blocks can be implemented by the CPU 110 executing programs P1 stored in the memory 117. Some or all of the functions may be implemented by hardware circuits.

The surrounding environment recognizer 111 repeatedly acquires a result of detection from the surroundings sensor 120 and recognizes at least one of a shape of a roadside object 30 and a travel history 21 of a second vehicle 20 as surroundings information. The roadside object is a three-dimensional structure extending along a side edge of the road. In the present embodiment, based on the result of detection from the surroundings sensor 120, the surrounding environment recognizer 111 recognizes the presence or absence of a roadside object and its location as surroundings information. The surrounding environment recognizer 111 further recognizes a travel history of a second vehicle as surroundings information using the existence, a location, a size, a distance, a travel direction, a travel speed, a yaw rate and the like of the second vehicle acquired from the surroundings sensor 120. The surrounding environment recognizer 111 may recognize, from a result of detection by the surroundings sensor 120, the existence of lane divider lines and their locations as surroundings information.

The reference line estimator 112 repeatedly estimates a reference line 11 formed of a sequence of points directed toward a travel direction from the vehicle-widthwise center of the vehicle 10 using the surroundings information recognized by the surrounding environment recognizer 111, thereby representing a road shape of a travel route of the vehicle 10. The reference line is a curve that is a vehicle-widthwise center line between the first lane boundaries described later. For example, Kalman filters or a least squares method may be used to estimate the reference line.

The first lane boundary setter 114 repeatedly sets a first lane boundary located at a first distance D1 from the reference line 11 estimated by the reference line estimator 112 to each of the left and the right of the own vehicle 10 in the vehicle-widthwise direction of the own vehicle 10. Each boundary of a lane in which the own vehicle is traveling is referred to as a first lane boundary. In the present embodiment, the first distance D1 is pre-stored in the memory 117. The first distance D1 is half a typical lane width. In some other embodiments, the first distance D1 may be determined based on a lane width learned by a vehicle width learner (not shown).

The output 115 is configured to repeatedly output the first lane boundaries set by the first lane boundary setter 114 to the driving controller 210 via the in-vehicle network 250 and others.

The driving controller 210 is configured as a microcomputer or the like including a CPU, a memory, and an interface (not shown). An automatic driving function may be implemented by the CPU of the driving controller 210 executing programs stored in the memory. The driving controller 210 controls the driving force control ECU 220, the braking force control ECU 230, and the steering control ECU 240 using the first lane boundaries or second lane boundaries described later.

The driving force control ECU 220 is an electronic control unit (ECU) that controls an actuator to generate vehicle driving forces. During manual driving of the vehicle, the driving force control ECU 220 controls a power source, such as an engine or an electric motor, in response to an amount of depression of an accelerator pedal. During automatic driving of the vehicle, the driving force control ECU 220 controls the power source in response to a requested driving force calculated by the driving controller 210.

The braking force control ECU 230 is an electronic control unit (ECU) that controls a brake actuator to generate vehicle braking forces. During manual driving of the vehicle, the braking force control ECU 230 controls the brake actuator in response to an amount of depression of a brake pedal. During automatic driving of the vehicle, the braking force control ECU 230 controls the brake actuator in response to a requested braking force calculated by the driving controller 210.

The steering control ECU 240 is an electronic control unit (ECU) that controls a motor to generate vehicle steering torques. During manual driving of the vehicle, the steering control ECU 240 controls the motor in response to a steering maneuver to generate a steering assistance torque. This can assist the driver in steering the vehicle with a small amount of force. During automatic driving of the vehicle, the steering control ECU 240 controls the motor in response to a requested steering angle calculated by the driving controller 210, thereby steering the vehicle.

Figure 2:
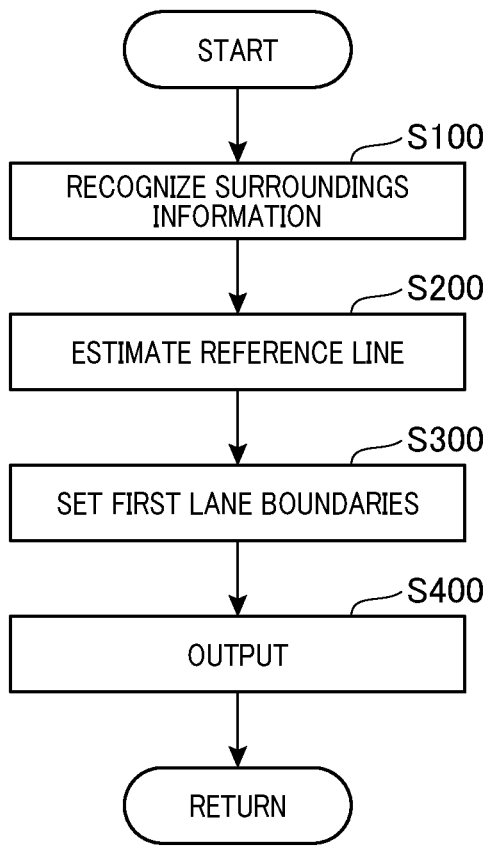
FIG. 2 is a flowchart of lane boundary setting processing according to a first embodiment.

Lane boundary setting processing as shown in FIG. 2 includes a series of process steps that enable the road shape recognition apparatus 105 to set lane boundaries on a road on which the own vehicle 10 is traveling. This lane boundary setting processing is performed by the road shape recognition apparatus 105 every predetermined time period, for example, every 100 milliseconds, during traveling of the own vehicle 10. The surroundings sensor 120 is configured to detect surroundings information in the travel direction of the own vehicle 10.

At step S100, the surrounding environment recognizer 111 acquires a result of detection from the surroundings sensor 120, recognizes at least one of a shape of a roadside object and a travel history of a second vehicle as surroundings information.

At step S200, the reference line estimator 112 estimates a reference line using the surroundings information recognized by the surrounding environment recognizer 111. The reference line estimator 112 estimates a sequence of points representing a road shape of a travel route in the travel direction of the own vehicle 10 and then estimates a reference line from the estimated sequence of points.

Figure 3:
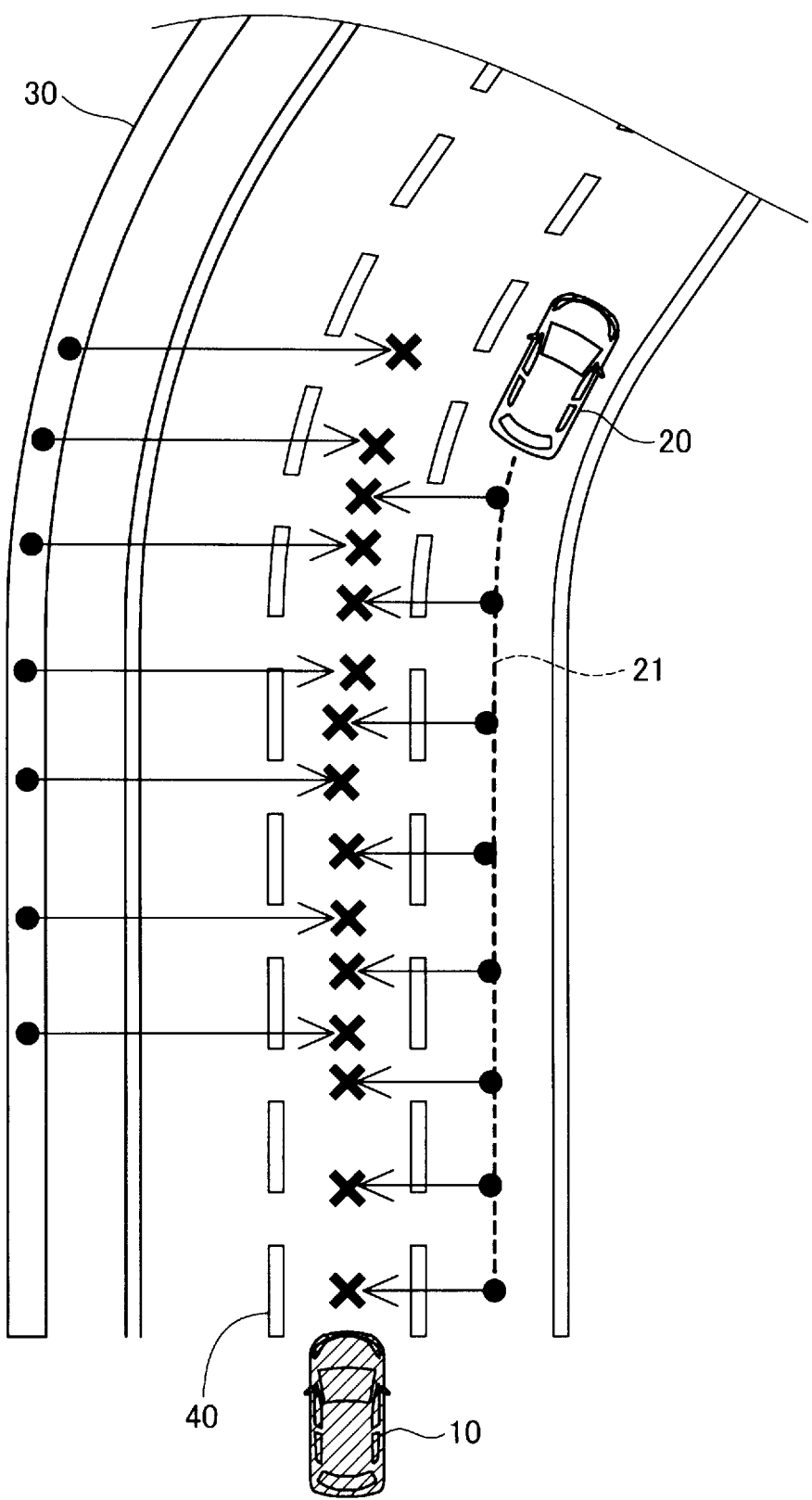
FIG. 3 is an example image of a sequence of points estimated by a reference line estimator.
Figure 4:
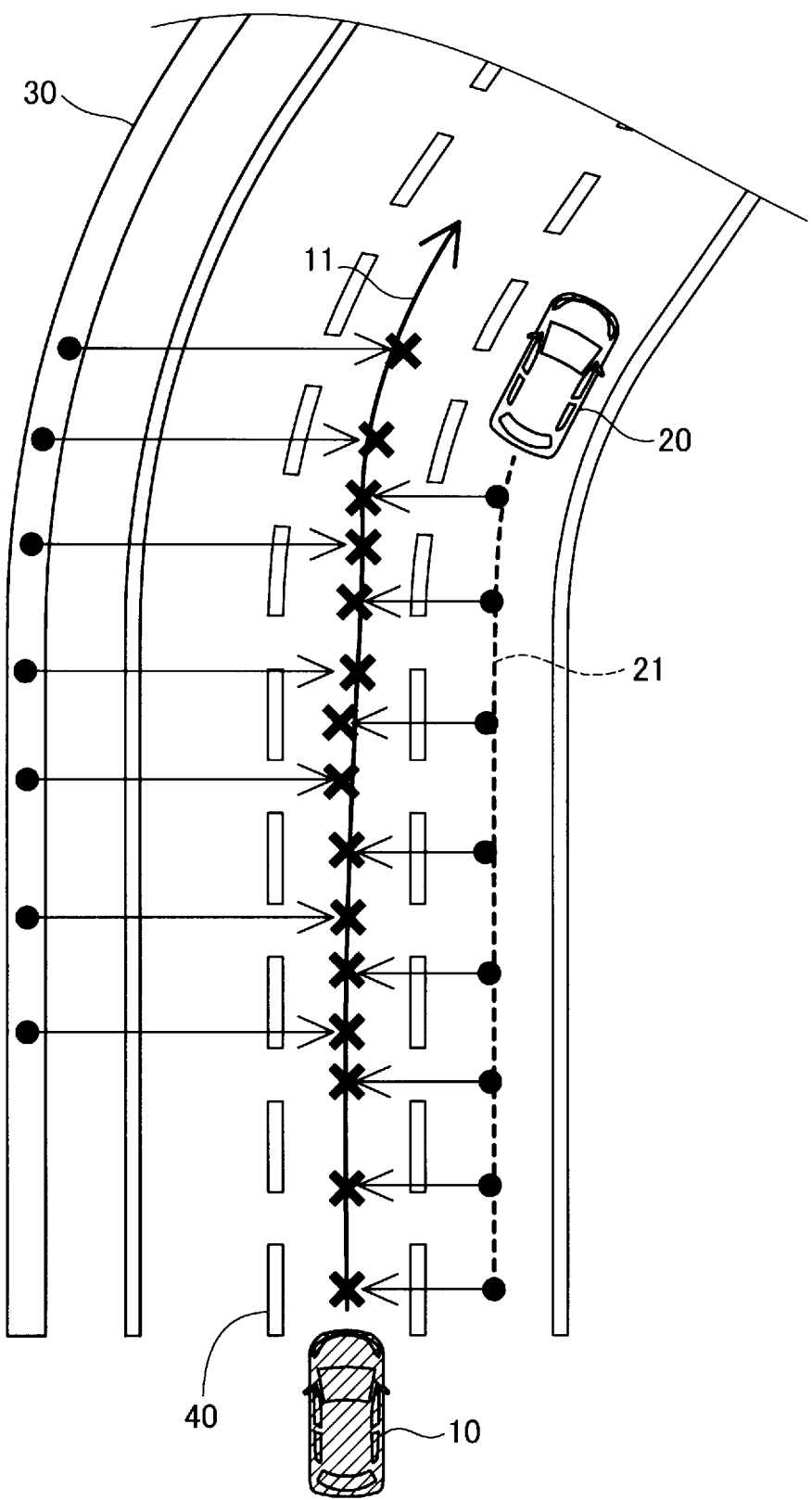
FIG. 4 is another example image of a reference line estimated by the reference line estimator.

In the present embodiment, as shown in FIG. 3, the reference line estimator 112 shifts the shape or contour of the roadside object 30 and the travel history 21 of the second vehicle 20 recognized by the surrounding environment recognizer 111 to the widthwise center of the own vehicle 10 and thereby estimates coordinate locations of the sequence of points. In alternative embodiments, the reference line estimator 112 may estimate coordinate locations of a sequence of points from shapes of left and right roadside objects 30 in the widthwise direction of the own vehicle 10, or may estimate coordinate locations of a sequence of points from travel histories 21 of left and right second vehicles 20 in the widthwise direction of the own vehicle 10. The reference line estimator 112 may estimate coordinate locations of a sequence of points from a shape of a left or right roadside object 30 in the widthwise direction of the own vehicle 10, or may estimate coordinate locations of a sequence of points from a travel history 21 of a left or right second vehicle 20 in the widthwise direction of the own vehicle 10. In FIG. 3 and other figures subsequent thereto, the sequence of points estimated by the reference line estimator 112 are indicated by "x" marks. The sequence of points are estimated toward a travel direction from the widthwise center of the own vehicle 10. As shown in FIG. 4, the reference line estimator 112 estimates the reference line 11 from the sequence of points using road models stored in the memory 117 and using Kalman filter and a least squares method.

Figure 5:
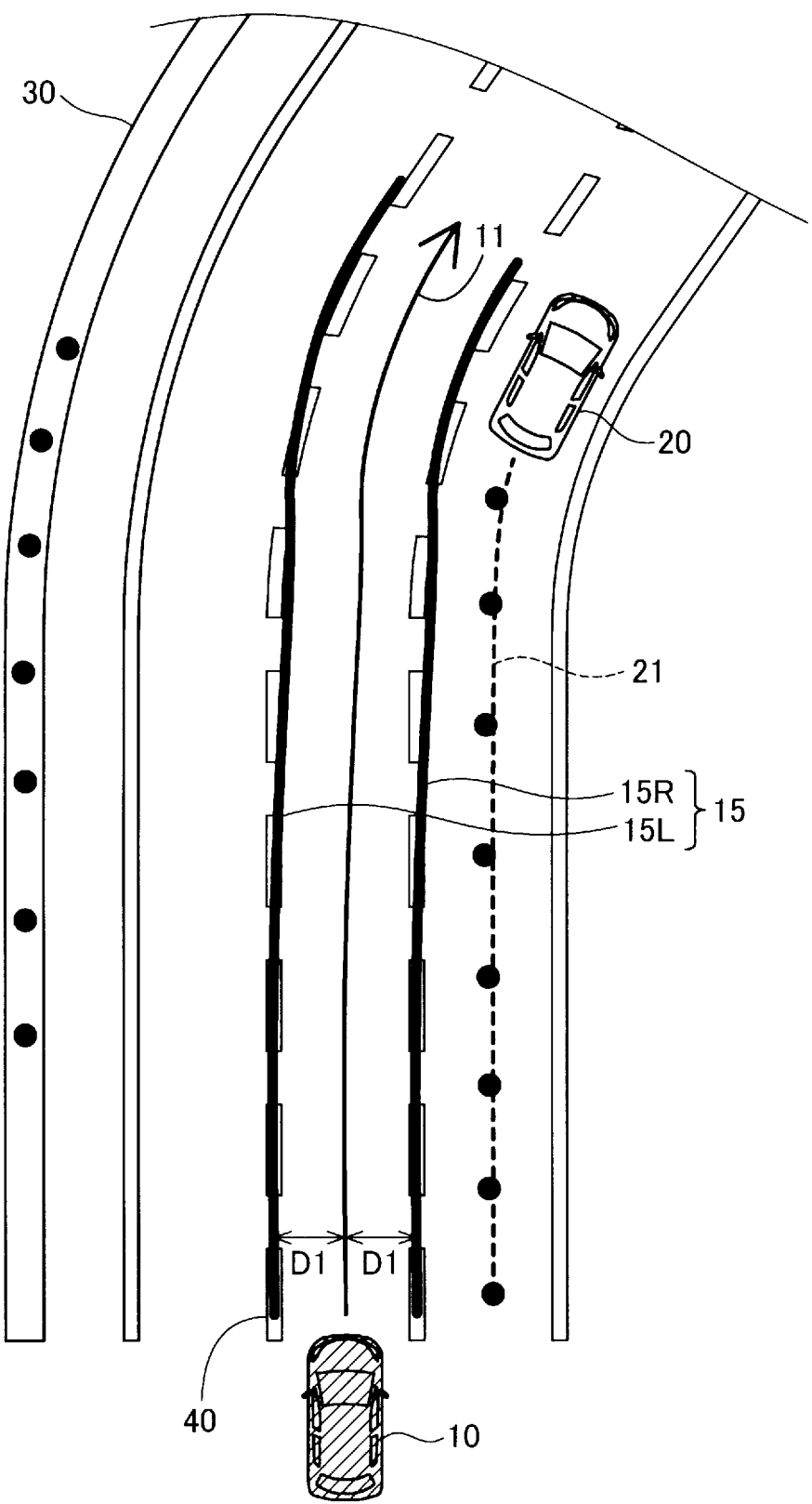
FIG. 5 is an example image of first lane boundaries set by a lane boundary setter.

At step S300, the first lane boundary setter 114 sets a first lane boundary located at a first distance D1 from the reference line 11 to the left of the own vehicle 10 in the vehicle-widthwise direction of the own vehicle 10 and a first lane boundary located at the same first distance D1 from the reference line 11 to the right of the own vehicle 10 in the vehicle-widthwise direction of the own vehicle 10. As shown in FIG. 5, at step S300, the boundary 15 located to the right of the own vehicle 10 in the vehicle-widthwise is referred to as a first lane boundary 15R. The boundary 15 located to the left of the own vehicle 10 in the vehicle-widthwise is referred to as a first lane boundary 15L.

At step S400 in FIG. 2, the output 115 outputs the first lane boundaries 15 set by the first lane boundary setter 114 to the driving controller 210 and other components. The lane boundary setting processing is thereby performed.

In the present embodiment, the road shape recognition apparatus 105 acquires a result of detection from the surroundings sensor 120, recognizes at least one of a shape of a roadside object 30 and a travel history 21 of a second vehicle 20 as surroundings information, repeatedly estimates a reference line 11 representing a road shape of a travel route with a sequence of points using the recognized surroundings information. The road shape recognition apparatus 105 repeatedly sets a first lane boundary located at a first distance D1 from the reference line 11 to a respective one of the left and the right of the own vehicle 10 in the vehicle-widthwise direction of the own vehicle 10. This configuration enables setting the first lane boundaries 15 even in cases where lane divider lines 40 as shown in FIGS. 3 to 5 fail to be recognized due to light reflection or the like. The second vehicle 20 and the road side object 30 having three-dimensional shapes can be detected further than lane divider lines 40 painted on a road, which enables detecting the first lane boundaries 15.

Modifications

Several modifications to the first embodiment set forth above will now be described.

B1. First Modification

Figure 6:
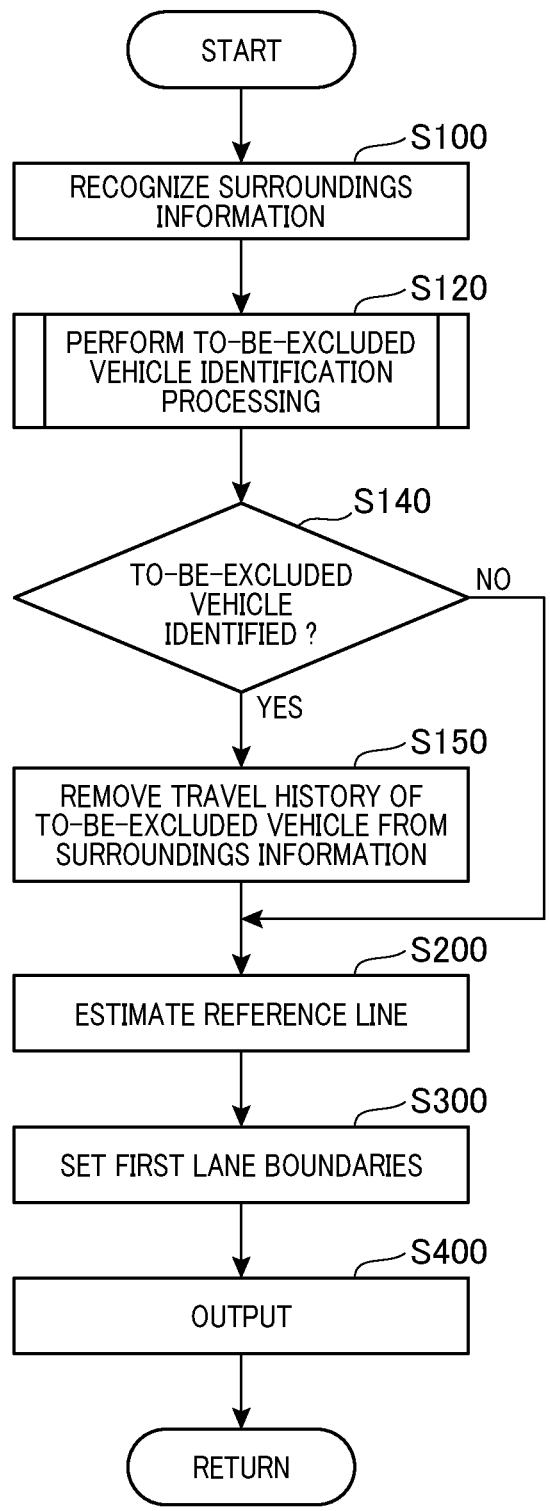
FIG. 6 is a flowchart of lane boundary setting processing according to a first modification to the first embodiment.

Lane boundary setting processing of a first modification as shown in FIG. 6 is different from that of the first embodiment in that step S120, step S140, and step S150 are added. The other process steps are the same as in the first embodiment. In the following, elements and process steps of the first modification as described in the first embodiment are numbered the same, and duplicate description will be omitted.

At step S120, the to-be-excluded vehicle identifier 113 shown in FIG. 1 identifies, from second vehicles around the own vehicle 10 in the travel direction of the own vehicle 10, a second vehicle whose travel history does not follow the road shape as a to-be-excluded vehicle, using the travel histories of the second vehicles recognized by the surrounding environment recognizer 111 and the lane boundaries set by the first lane boundary setter 114. In the present embodiment, the to-be-excluded vehicle identifier 113 identifies a second vehicle (that is a vehicle other than the own vehicle 10) whose travel history does not follow the road shape as a first to-be-excluded vehicle, using a travel history of the second vehicle recognized by the surrounding environment recognizer 111 and the first lane boundaries 15 set by the first lane boundary setter 114.

Figure 7:
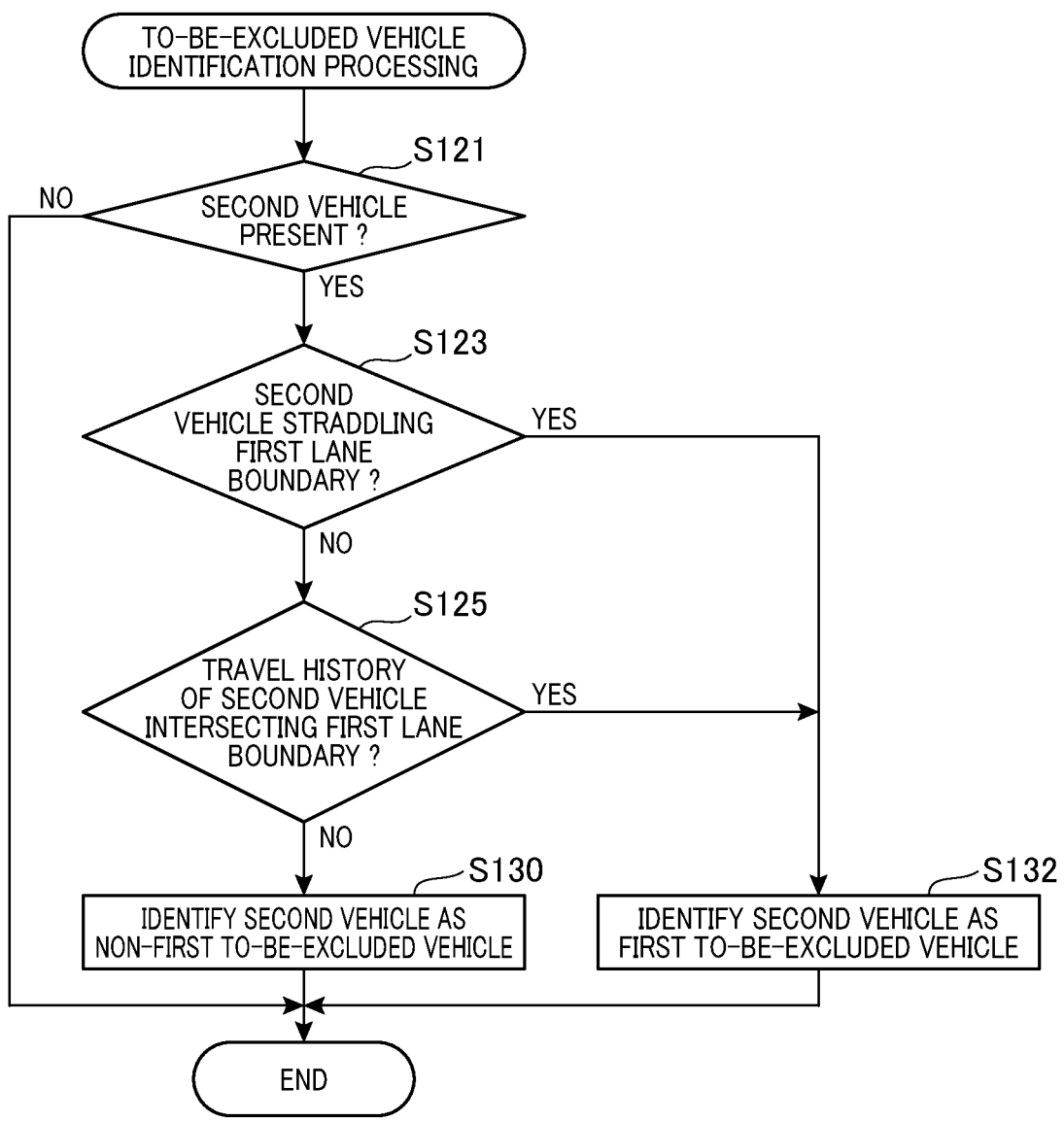
FIG. 7 is a flowchart of to-be-excluded vehicle identification processing according to the first modification to the first embodiment.

FIG. 7 illustrates a flowchart of to-be-excluded vehicle identification processing performed by the to-be-excluded vehicle identifier 113. At step S121, the to-be-excluded vehicle identifier 113 acquires a result of detection from the surroundings sensor 120 and determines whether or not there is a second vehicle, that is, a vehicle other than the own vehicle 10, in the travel direction of the own vehicle 10. If there is a second vehicle in the travel direction of the own vehicle 10. The process flow proceeds to step S123. If there is no second vehicle in the travel direction of the own vehicle 10, then the process flow ends.

Figure 8:
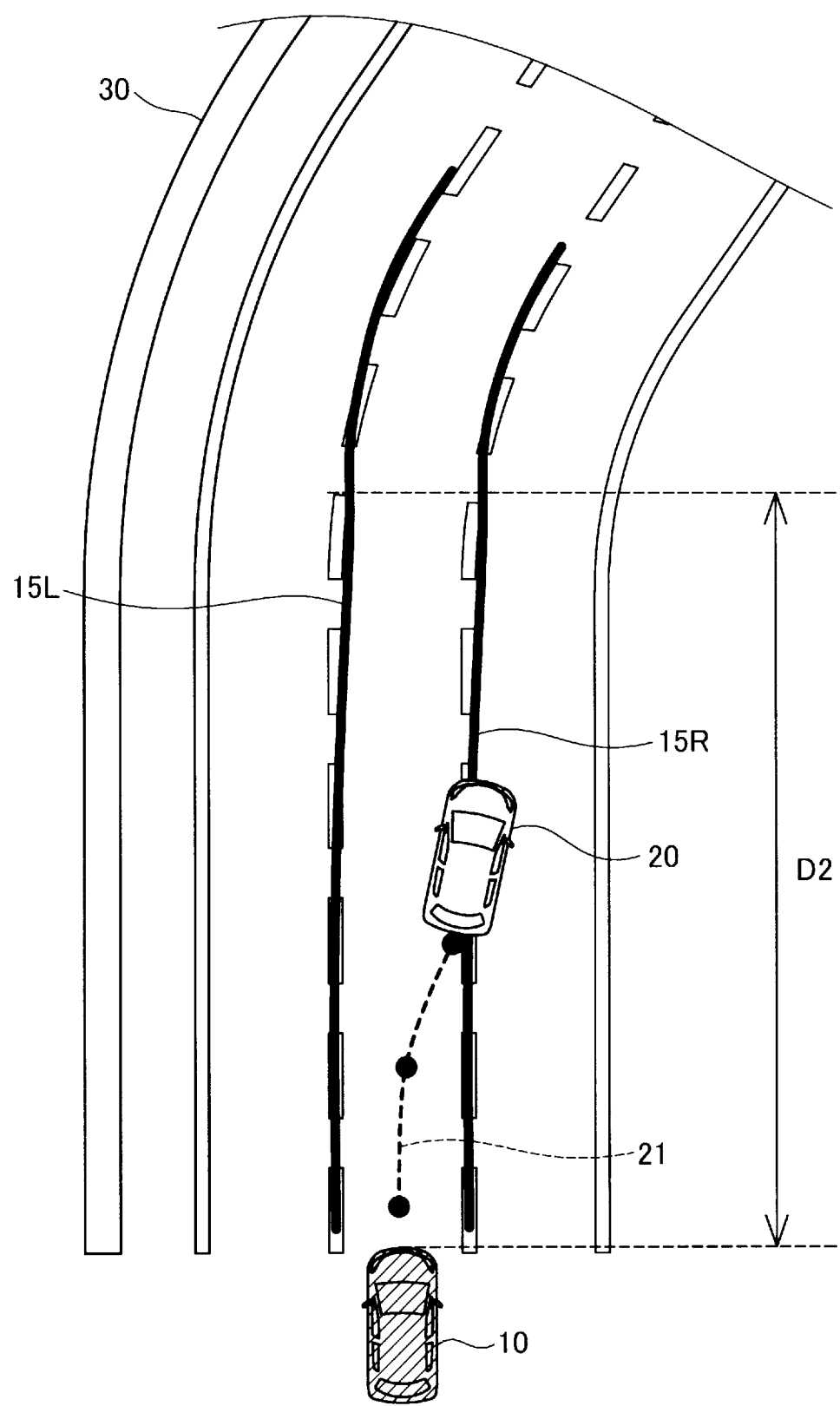
FIG. 8 is an example of another vehicle identified as a first to-be-excluded vehicle.

At step S123, the to-be-excluded vehicle identifier 113 determines, using a captured image acquired at the start of current to-be-excluded vehicle identification processing, whether or not the second vehicle is straddling at least one of the first lane boundaries 15 set in the previous lane boundary setting processing within a second distance D2 in the travel direction of the own vehicle 10. The second distance D2 is distance from the vehicle-widthwise center of the own vehicle 10 in the travel direction of the own vehicle 10. The second distance D2 is a distance set for the reference line estimator 112 to estimate a sequence of points, which is determined by experiment or simulation using a detection range of the surroundings sensor 120. In an example case where the answer is "YES" at step S123, at least part of the second vehicle 20 is straddling the first lane boundary 15 as shown in FIG. 8. If the second vehicle is straddling at least one of the first lane boundaries 15 within the second distance D2 in the travel direction of the own vehicle 10 as shown in FIG. 8, the process flow then proceeds to step S132, where the to-be-excluded vehicle identifier 113 identifies the second vehicle 20 as a first to-be-excluded vehicle. If the second vehicle is straddling none of the first lane boundaries 15 within the second distance D2 in the travel direction of the own vehicle 10, the process flow proceeds to step S125.

At step S125, the to-be-excluded vehicle identifier 113 determines the travel history of the second vehicle intersects at least one of the first lane boundaries 15 within the second distance D2 until the start of the current lane boundary setting processing after the end of the previous lane boundary setting processing. That is, at step S125, the to-be-excluded vehicle identifier 113 identifies the second vehicle that has crossed at least one of the first lane boundaries 15 until the start of the current lane boundary setting processing after the end of the previous lane boundary setting processing as a first to-be-excluded vehicle.

Figure 9:
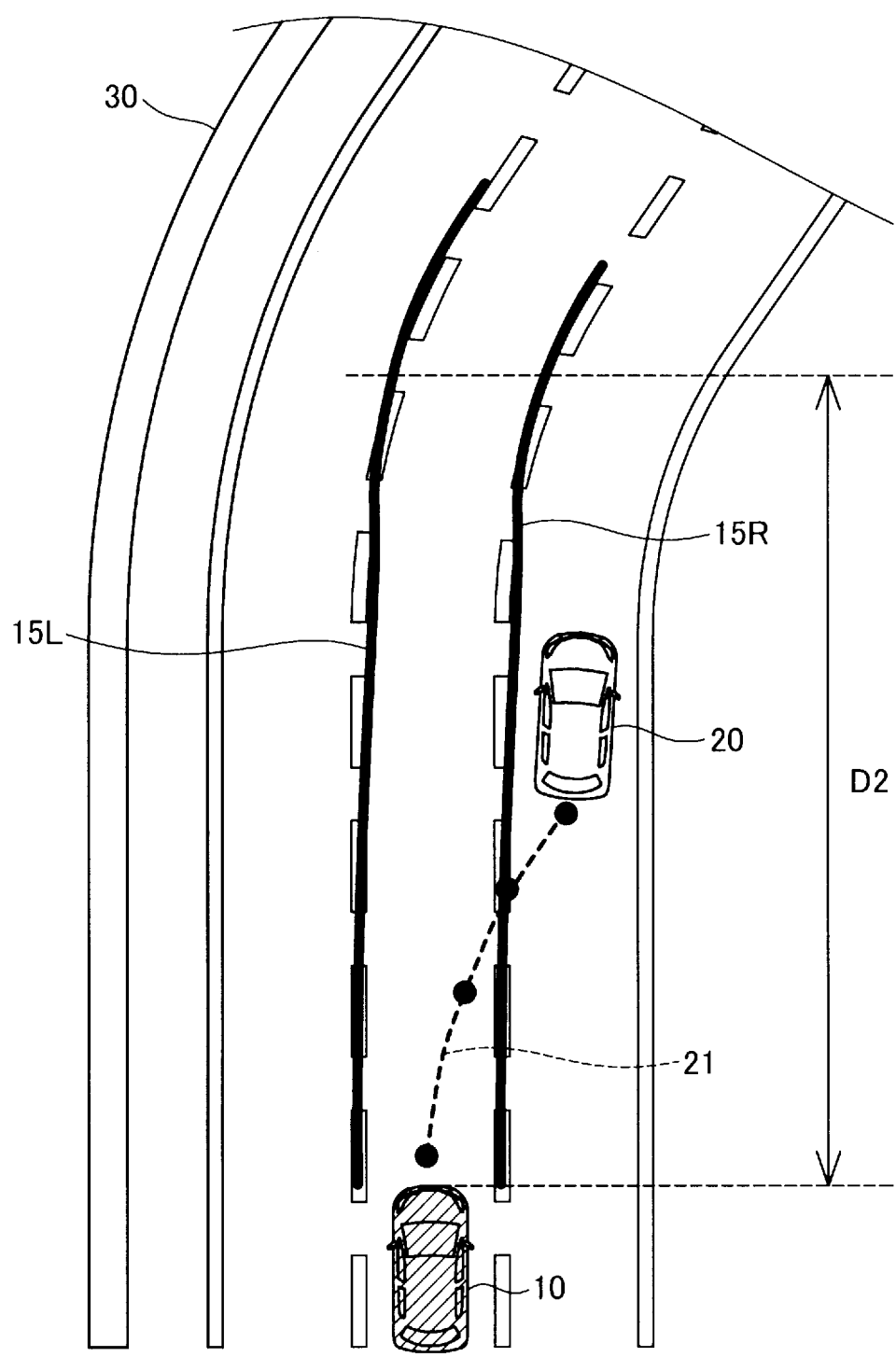
FIG. 9 is another example of another vehicle identified as a first to-be-excluded vehicle.
Figure 10:
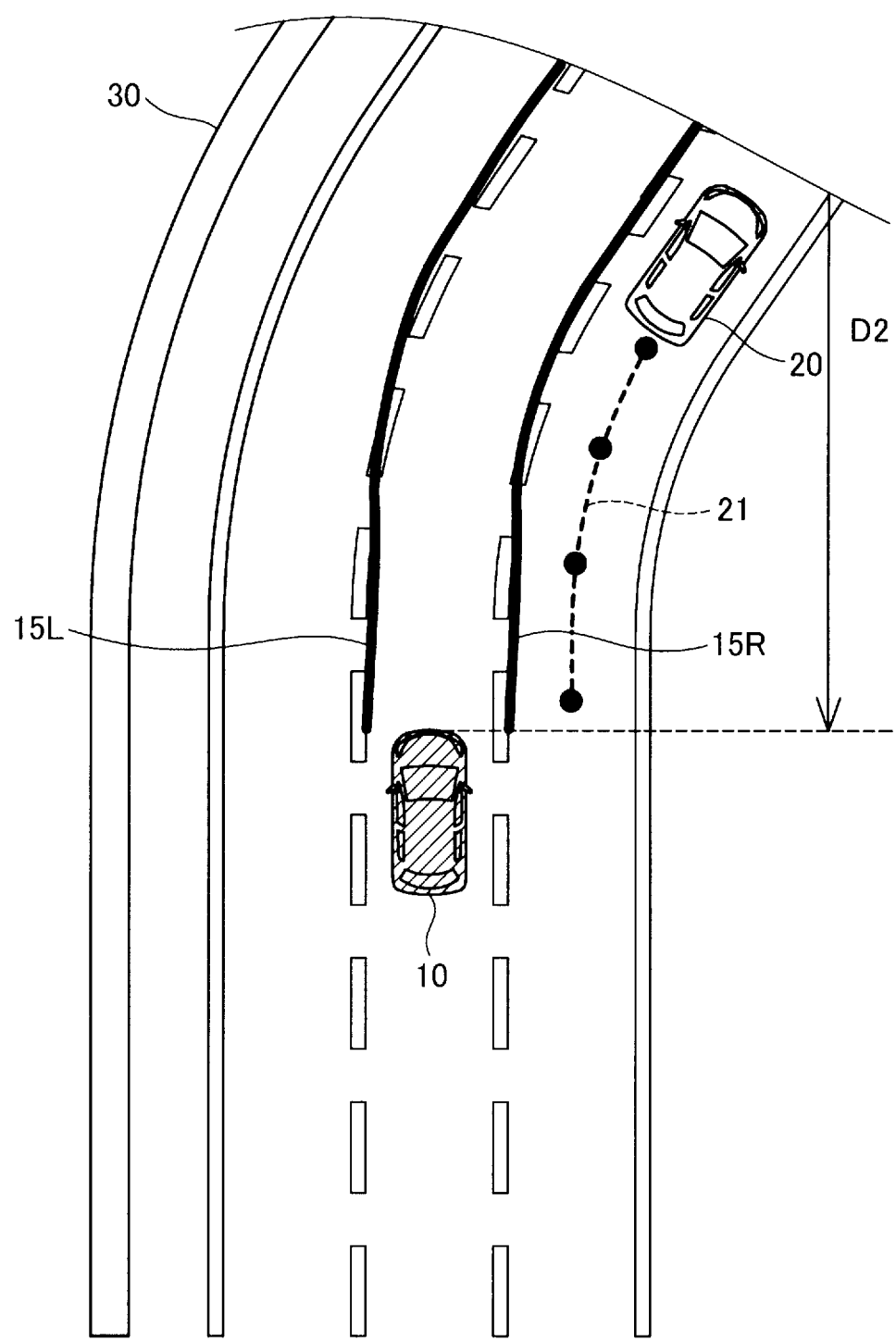
FIG. 10 is an example of another vehicle not identified as a first to-be-excluded vehicle.

If the travel history 21 of the second vehicle 20 intersects at least one of the first lane boundaries 15 within the second distance D2 as shown in FIG. 9, the process flow proceeds to step S132, the to-be-excluded vehicle identifier 113 identifies the second vehicle 20 as a first to-be-excluded vehicle. If, as shown in FIG. 10, the travel history 21 of the second vehicle 20 intersects none of the first lane boundaries 15 within the second distance D2, the process flow proceeds to step S130, where the to-be-excluded vehicle identifier 113 does not identify the second vehicle 20 as a first to-be-excluded vehicle. In this way, the to-be-excluded vehicle identifier 113 performs the to-be-excluded vehicle identification processing.

Returning to FIG. 6, at step S140, the reference line estimator 112 determines whether or not there is a second vehicle identified by the to-be-excluded vehicle identifier 113 as a to-be-excluded vehicle. If there is a second vehicle identified by the to-be-excluded vehicle identifier 113 as a to-be-excluded vehicle, the process flow proceeds to step S150. If there is no second vehicle identified by the to-be-excluded vehicle identifier 113 as a to-be-excluded vehicle, the process flow proceeds to step S200.

At step S150, the reference line estimator 112 excludes the travel history 21 of the to-be-excluded vehicle from the surroundings information. That is, if the answer is "YES" at step S140, then at step S200 the reference line estimator 112 estimates a reference line 11 using the surroundings information having the travel history of the to-be-excluded vehicle excluded.

In the present embodiment, the to-be-excluded vehicle identifier 113 identifies a second vehicle 20 whose travel history does not follow the road shape as a first to-be-excluded vehicle, using the first lane boundaries 15 and the travel history 21 of the second vehicle 20. The reference line estimator 112 estimates the reference line 11 without using the travel history 21 of the first to-be-excluded vehicle identified by the to-be-excluded vehicle identifier 113, thereby setting first lane boundaries 15 that follow the road shape.

In the present embodiment, the to-be-excluded vehicle identifier 113 identifies, within the second distance D2 in the travel direction of the own vehicle 10, the second vehicle 20 that is straddling at least one of the first lane boundaries 15 or whose travel history 21 intersects at least one of the first lane boundaries 15 as a first to-be-excluded vehicle. This configuration enables properly identifying the second vehicle 20 whose travel history 21 does not follow the road shape, thereby properly setting the first lane boundaries 15.

C1. Second Modification

Figure 11:
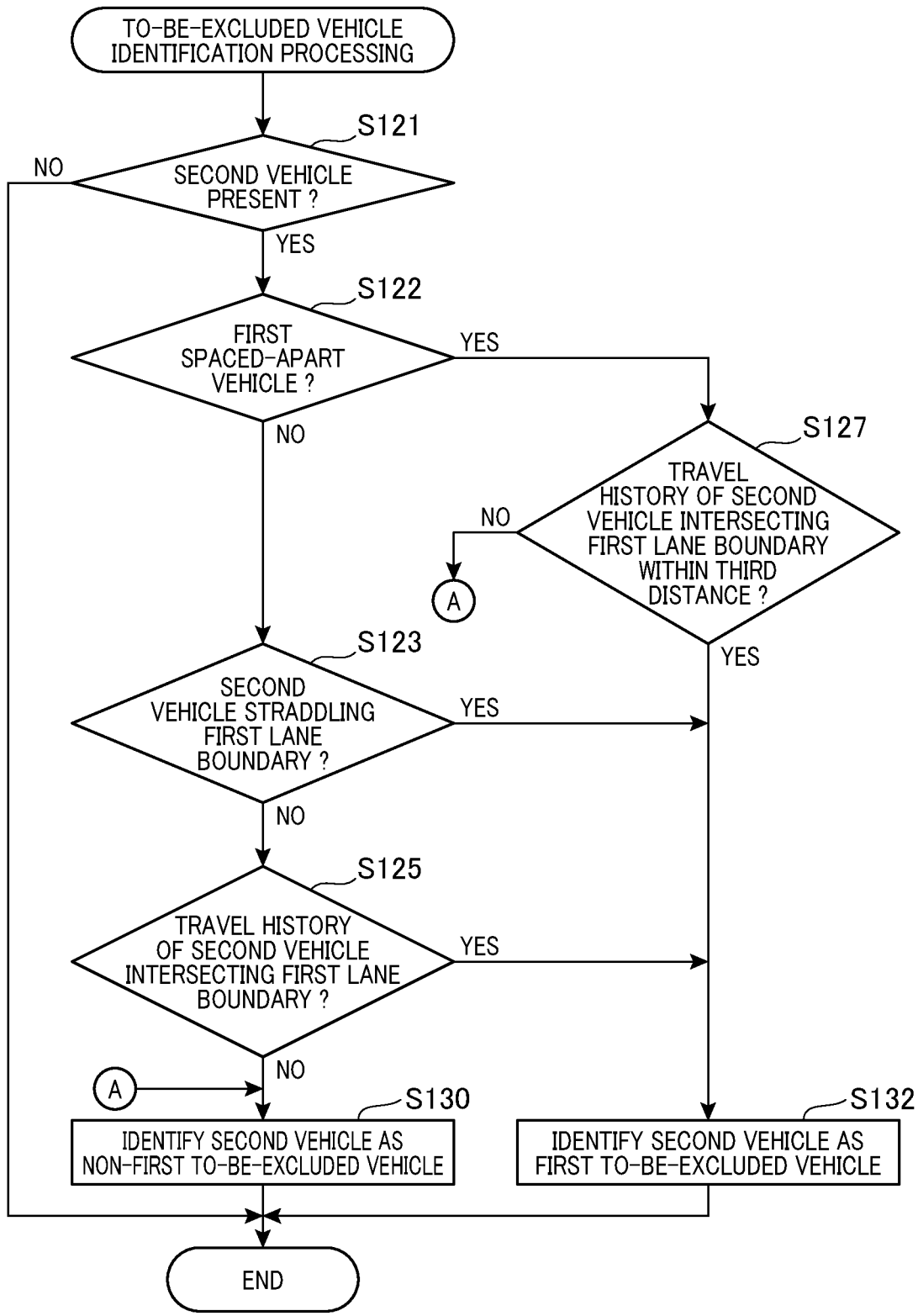
FIG. 11 is a flowchart of to-be-excluded vehicle identification processing according to a second modification to the first embodiment.

To-be-excluded vehicle identification processing of a second modification performed by the to-be-excluded vehicle identifier 113 as shown in FIG. 11 is different from that of the first modification in that steps S122 and S127 are added. The other process steps are the same as in the first modification.

If it is determined at step S121 that there is a vehicle other than the own vehicle 10 in the travel direction of the own vehicle 10, then the process flow proceeds to step S122.

At step S122, the to-be-excluded vehicle identifier 113 determines whether or not the detected second vehicle is a first spaced-apart vehicle. The first spaced-apart vehicle is a vehicle other than the own vehicle 10, located further than a third distance D3 from the own vehicle 10 in the travel direction from the vehicle-widthwise center of the own vehicle 10. The third distance D3 is equal to or greater than the the second distance D2. In the present embodiment, it is assumed that the third distance D3 is equal to the second distance D2. The third distance D3 is set to a distance that enables properly setting the first lane boundaries 15 from a relationship between a processing speed of the road shape recognition apparatus 105 and the travel speed of the own vehicle 10, plus some margin. The third distance D3 is determined by experiment or simulation. If it is determined at step S122 that the second vehicle 20 is not a first spaced-apart vehicle, then the process flow proceeds to step S123. Process steps S123 to S132 are performed in a similar manner as in the first modification. If it is determined at step S122 that the second vehicle 20 is a first spaced-apart vehicle, then the process flow proceeds to step S127.

Figure 12:
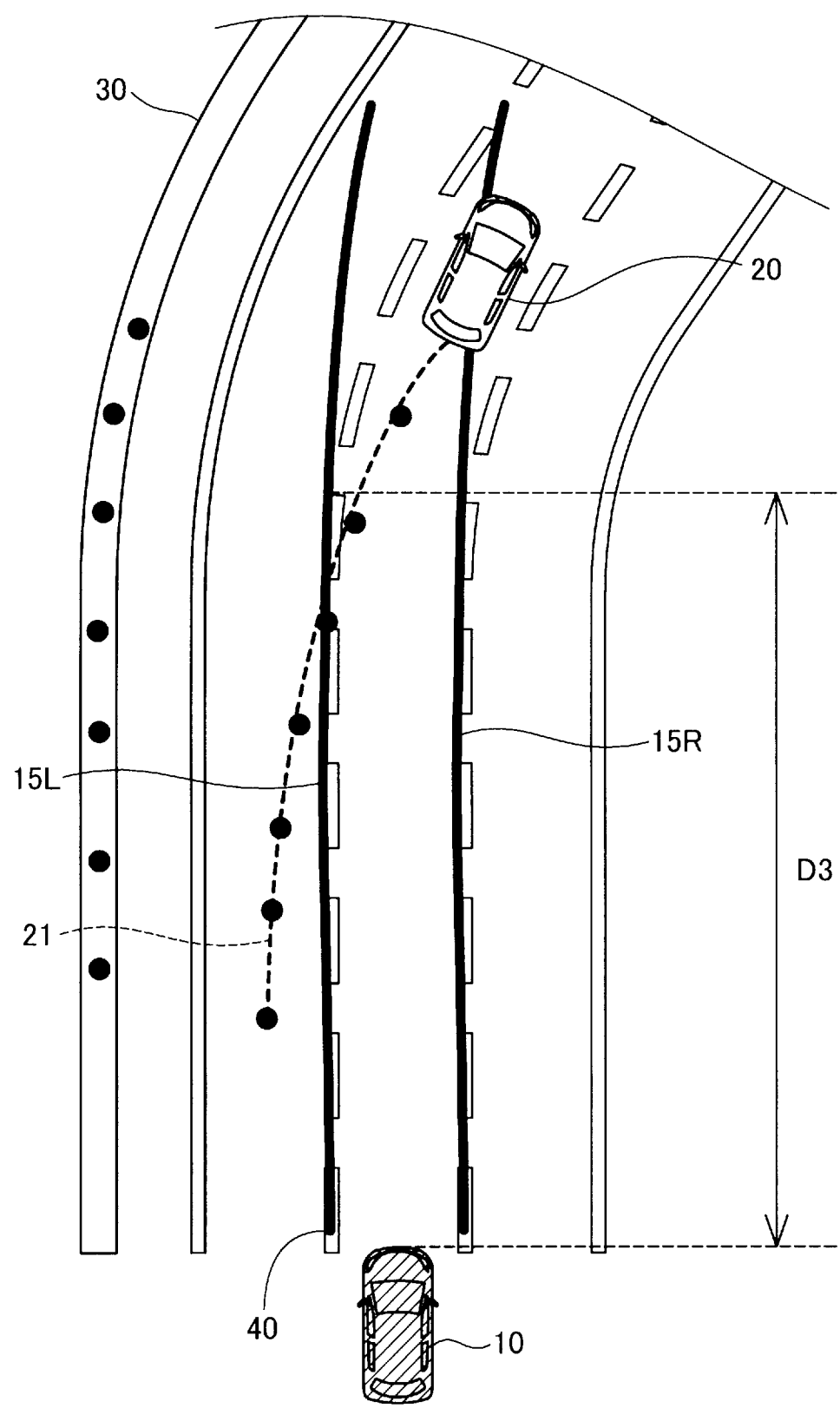
FIG. 12 is an example of a first spaced-apart vehicle identified as a first to-be-excluded vehicle.
Figure 13:
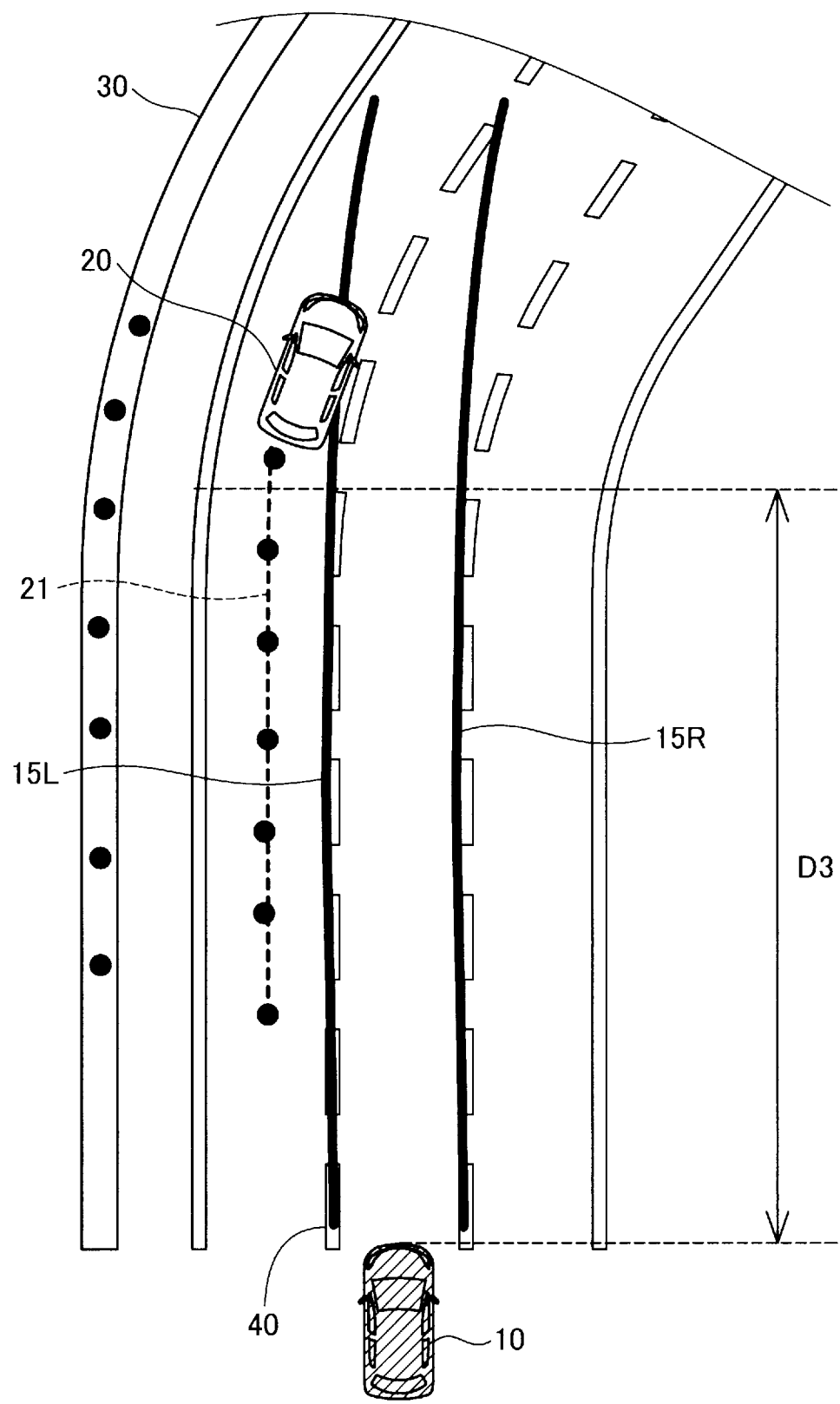
FIG. 13 is an example of a first spaced-apart vehicle not identified as a first to-be-excluded vehicle.
Figure 14:
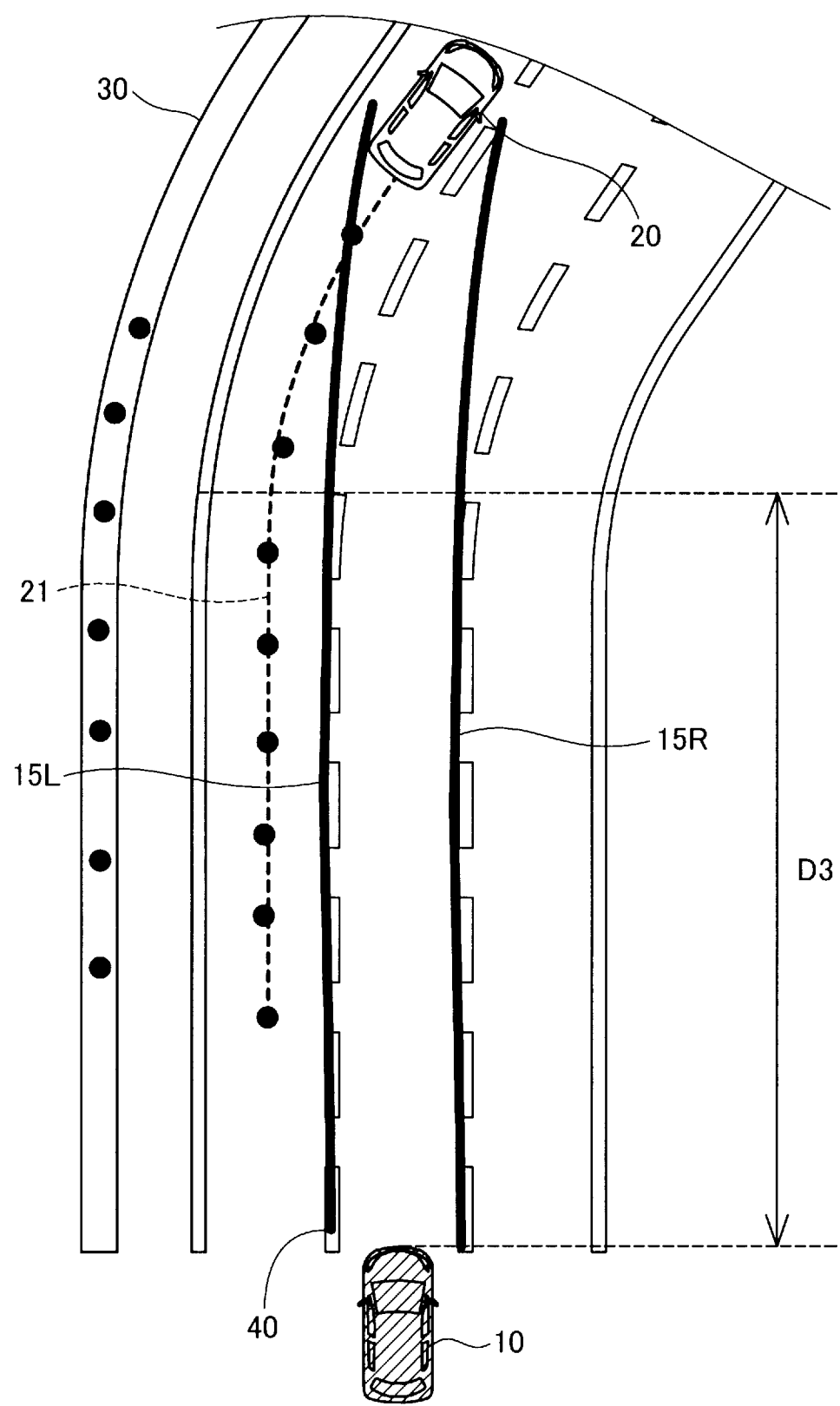
FIG. 14 is another example of a first spaced-apart vehicle not identified as a first to-be-excluded vehicle.

At step S127, the to-be-excluded vehicle identifier 113 determines whether or not a travel history 21 of the first spaced-apart vehicle intersects at least one of the first lane boundaries 15 set in the previous lane boundary setting processing within the third distance D3. FIGS. 12 to 14 illustrate examples of the second vehicle 20 as a first spaced-apart vehicle and the first lane boundaries 15. If, as shown in FIG. 12, it is determined that the travel history 21 of the first spaced-apart vehicle intersects at least one of the first lane boundaries 15 within the third distance D3, the process flow proceeds to step S132, where the to-be-excluded vehicle identifier 113 identifies the first spaced-apart vehicle as a first to-be-excluded vehicle.

In an example case of FIG. 13, the second vehicle 20 is straddling at least one of the first lane boundaries 15 set by the first lane boundary setter 114 at a distance greater than the third distance D3, but the travel history 21 of the second vehicle 20 intersects none of the first lane boundaries 15 within the third distance D3. In an example case of FIG. 14, the travel history 21 of the second vehicle 20 intersects at least one of the first lane boundaries 15 set by the first lane boundary setter 114 at a distance greater than the third distance D3. In the cases of FIGS. 13 and 14, the process flow proceeds to step S130, where the to-be-excluded vehicle identifier 113 does not identify the second vehicle 20 as a first to-be-excluded vehicle.

In the subsequent reference line estimate processing (at step S200 in FIG. 6), the reference line estimator 112 estimates a reference line 11 using the surroundings information including a travel history of the second vehicle, of the first spaced-apart vehicles, that intersects none of the first lane boundaries 15 within the third distance D3.

If the road shape significantly changes, e.g., at the entry or exit of a curve, the first lane boundaries 15 away from the own vehicle 10 may not follow the road shape from a relationship between a processing speed of the road shape recognition apparatus 105 and the travel speed of the own vehicle 10. However, if the travel history of the first spaced-apart vehicle intersects none of the first lane boundaries 15 within the third distance D3, the travel history of the first spaced-apart vehicle is considered to follow the road shape. In the present embodiment, a second vehicle 20, of the first spaced-apart vehicles located further than the third distance D3 from the own vehicle 10, whose travel history intersects none of the first lane boundaries 15 within the third distance D3 from the own vehicle 10 in the travel direction of the own vehicle 10 is not identified as a first to-be-excluded vehicle. Therefore, the reference line 11 can be estimated using a travel history of a vehicle other than the own vehicle, of the first spaced-apart vehicles, following the road shape, which can increase the estimation accuracy of the reference line.

D1. Third Modification

Figure 15:
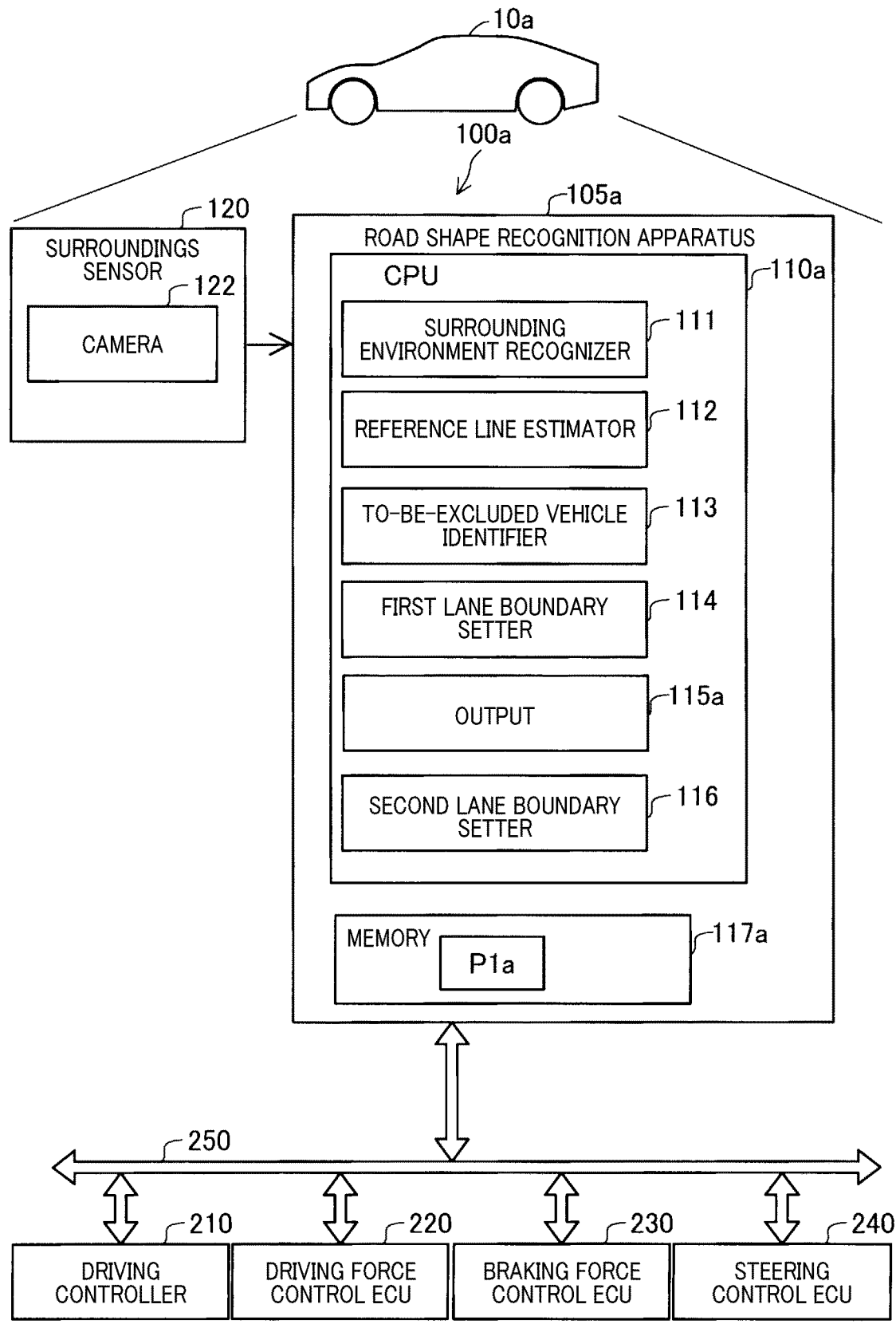
FIG. 15 is a schematic block diagram of a road shape recognition apparatus according to a third modification to the first embodiment.

As shown in FIG. 15, in a third modification, a vehicle 10a is equipped with an automatic driving control system 100a including a road shape recognition apparatus 105a. In the present embodiment, the road shape recognition apparatus 105a is different from the road shape recognition apparatus 105 in that a second lane boundary setter 116 is added and an output 115a is included instead of the output 115. The road shape recognition apparatus 105a includes, as functional blocks, the surrounding environment recognizer 111, the reference line estimator 112, the to-be-excluded vehicle identifier 113, the first lane boundary setter 114, the output 115a, and the second lane boundary setter 116. Functions of these functional blocks may be implemented by the CPU 110a of the road shape recognition apparatus 105a executing programs P1a stored in the memory 117a.

The second lane boundary setter 116 is configured to set, for each of the first lane boundaries 15 set by the first lane boundary setter 114, a second lane boundary on an opposite side of the first lane boundary 15 from the own vehicle 10. For each of the first lane boundaries 15R, 15L, the opposite side of the first lane boundary 15 from the own vehicle 10 is also referred to as an outside of the first lane boundary. The output 115a is configured to output the second lane boundaries, in addition to the first lane boundaries 15.

Figure 16:
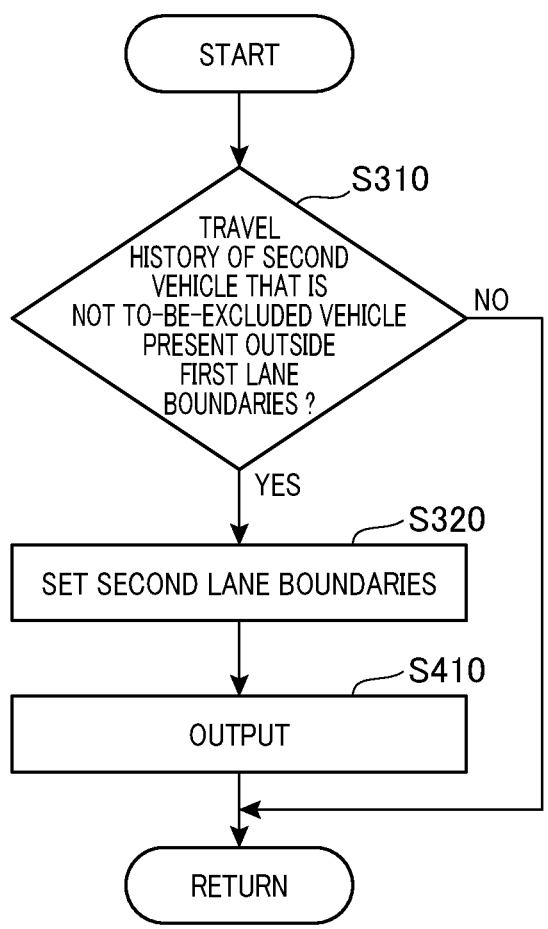
FIG. 16 is a flowchart of second lane boundary setting processing.

FIG. 16 illustrates a flowchart of lane boundary setting processing performed by the second lane boundary setter 116. This processing is performed each time the first lane boundaries 15 are set by the first lane boundary setter 114.

At step S310, using information about travel histories of second vehicles recognized by the surrounding environment recognizer 111, first lane boundaries 15 set by the first lane boundary setter 114, and to-be-excluded vehicles identified by the to-be-excluded vehicle identifier 113, the second lane boundary setter 116 determines whether or not there is a travel history of a second vehicle that is not a to-be-excluded vehicle, outside at least one of the first lane boundaries 15. If there is a travel history of a second vehicle that is not a to-be-excluded vehicle, outside at least one of the first lane boundaries 15, then the process flow proceeds to step S320. If there is no travel history of a second vehicle that is not a to-be-excluded vehicle, outside each one of the first lane boundaries 15, then the process flow ends.

At step S320, on a side of the first lane boundary 15 where a travel history of the second vehicle that is not a to-be-excluded vehicle is recognized outside the first lane boundary 15, the second lane boundary setter 116 sets a second lane boundary at a fourth predetermined distance D4 from the first lane boundary 15. The second lane boundary setter 116 sets one second lane boundary for each travel history. The fourth predetermined distance D4 is a vehicle width determined by experiment or simulation and pre-stored in the memory 117a. In the present embodiment, the fourth distance D4 is twice the first distance D1.

At step S410, the output 115a outputs the second lane boundaries set at step S320.

Figure 17:
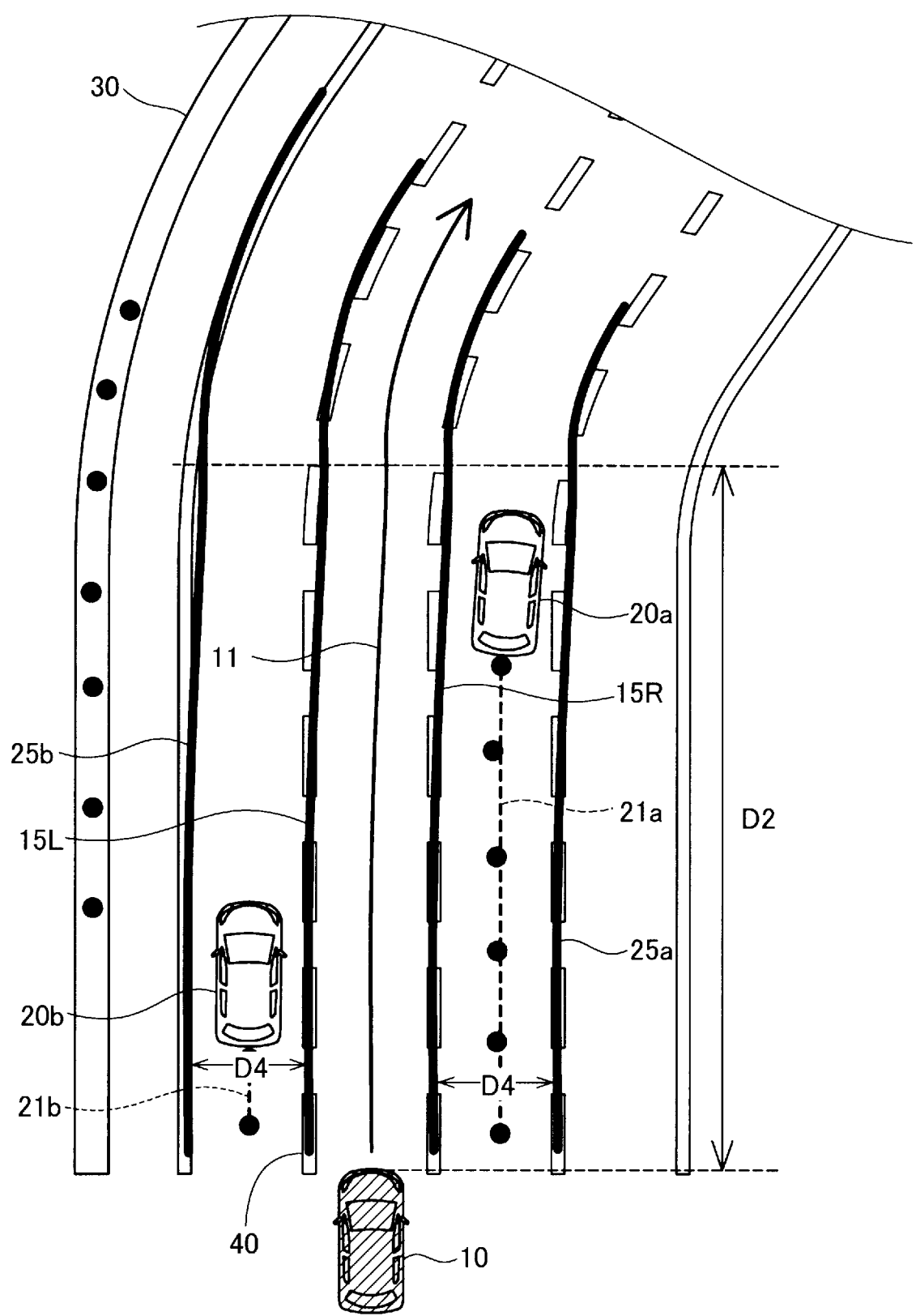
FIG. 17 is an example scenario where a second lane boundary is set outside each first lane boundary.
Figure 18:
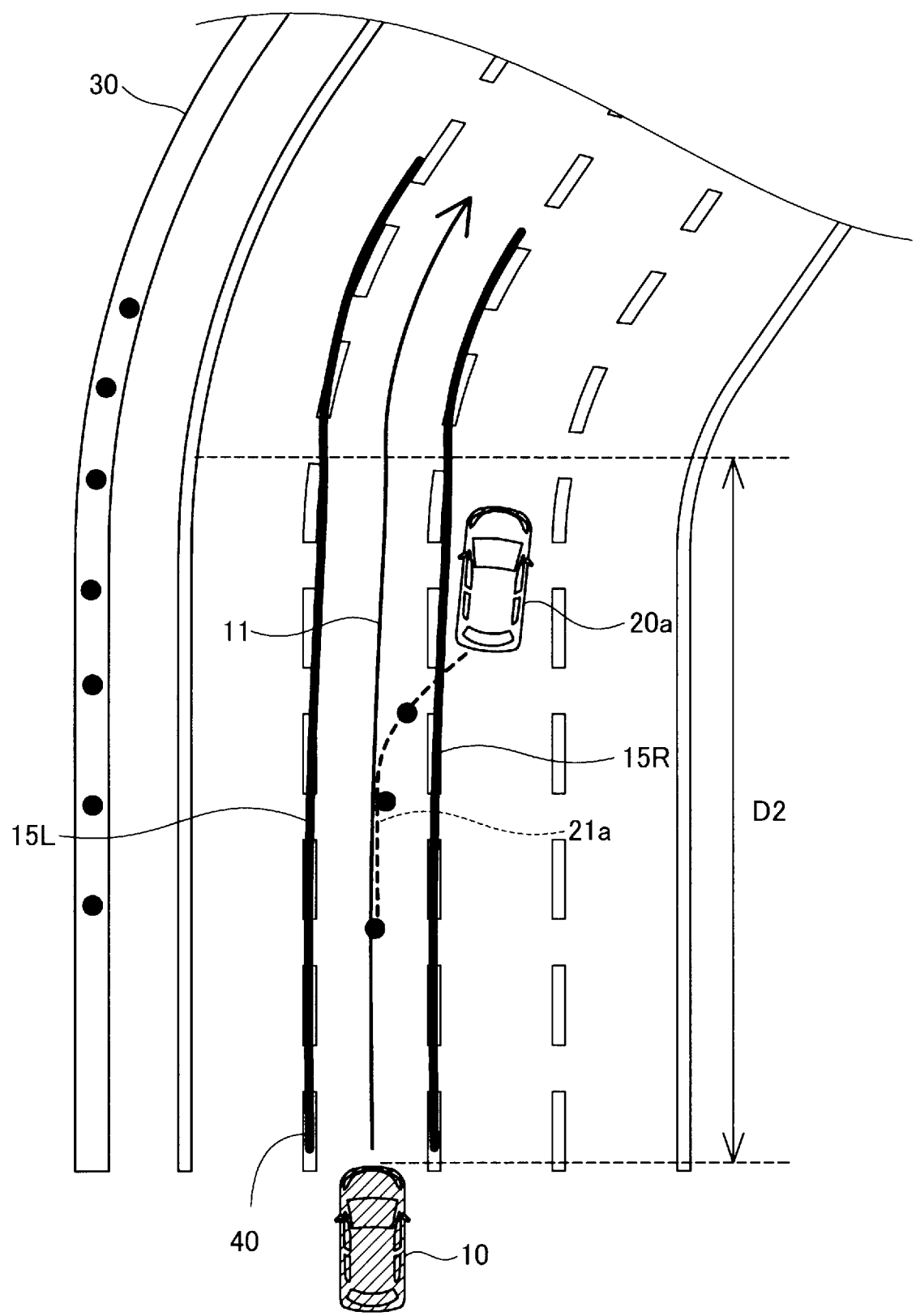
FIG. 18 is an example scenario where no second lane boundary is set outside each of first lane boundaries.

In an example shown in FIG. 17, a travel history 21a of a second vehicle 20a is to the right of the first lane boundary 15R and a travel history 21b of a second vehicle 20b is to the left of the first lane boundary 15L. The travel history 21a of the second vehicle 20a does not intersect the first lane boundary 15 within the second distance D2. Therefore, the second vehicle 20a is not identified as a first to-be-excluded vehicle. The second lane boundary setter 116 sets a second lane boundary 25a by shifting the first lane boundary 15R to the right of the first lane boundary 15R by the fourth distance D4. In addition, the travel history 21b of the second vehicle 20b does not intersect the left first lane boundary 15L within the second distance D2. Therefore, the second vehicle 20b is not identified as a first to-be-excluded vehicle. Thus, the second lane boundary setter 116 sets a second lane boundary 25b by shifting the first lane boundary 15L to the left of the first lane boundary 15L by the fourth distance D4. In an example shown in FIG. 18, a travel history 21a of a second vehicle 20a is to the right of the first lane boundary 15R. Since the travel history 21a of the second vehicle 20a intersects the first lane boundary 15R within the second distance D2, the second vehicle 20a is identified as a first to-be-excluded vehicle. Thus, the second lane boundary setter 116 does not set a second lane boundary to the right of the first lane boundary 15R.

In the present embodiment, the second lane boundary setter 116 is configured to, if a travel history of the second vehicle that is not identified as a to-be-excluded vehicle is recognized outside at least of the left and right first lane boundaries, further set a second lane boundary on a side of the first lane boundary where the travel history of the second vehicle is recognized.

At step S310, the second lane boundary setter 116 sets second lane boundaries using the first lane boundaries 15 and the travel histories 21 of the second vehicles. Alternatively or additionally, the second lane boundary setter 116 may be configured to, if a lane divider line on an opposite side of at least one of the first lane boundaries 15 from the own vehicle 10 is recognized by the surrounding environment recognizer 111 as the surroundings information, set a second lane boundary at the fourth distance D4 from the first lane boundary 15 on a side of the first lane boundary 15 where the lane divider line is recognized outside the first lane boundary 15.

E1. Fourth Modification

In a fourth modification, the to-be-excluded vehicle identifier 113 is further configured to, using travel histories of second vehicles and second lane boundaries set by the second lane boundary setter 116, identify a vehicle, of second vehicles 20 around the own vehicle 10 in the travel direction of the own vehicle 10, whose travel history 21 does not follow the road shape as a second to-be-excluded vehicle.

Figure 19:
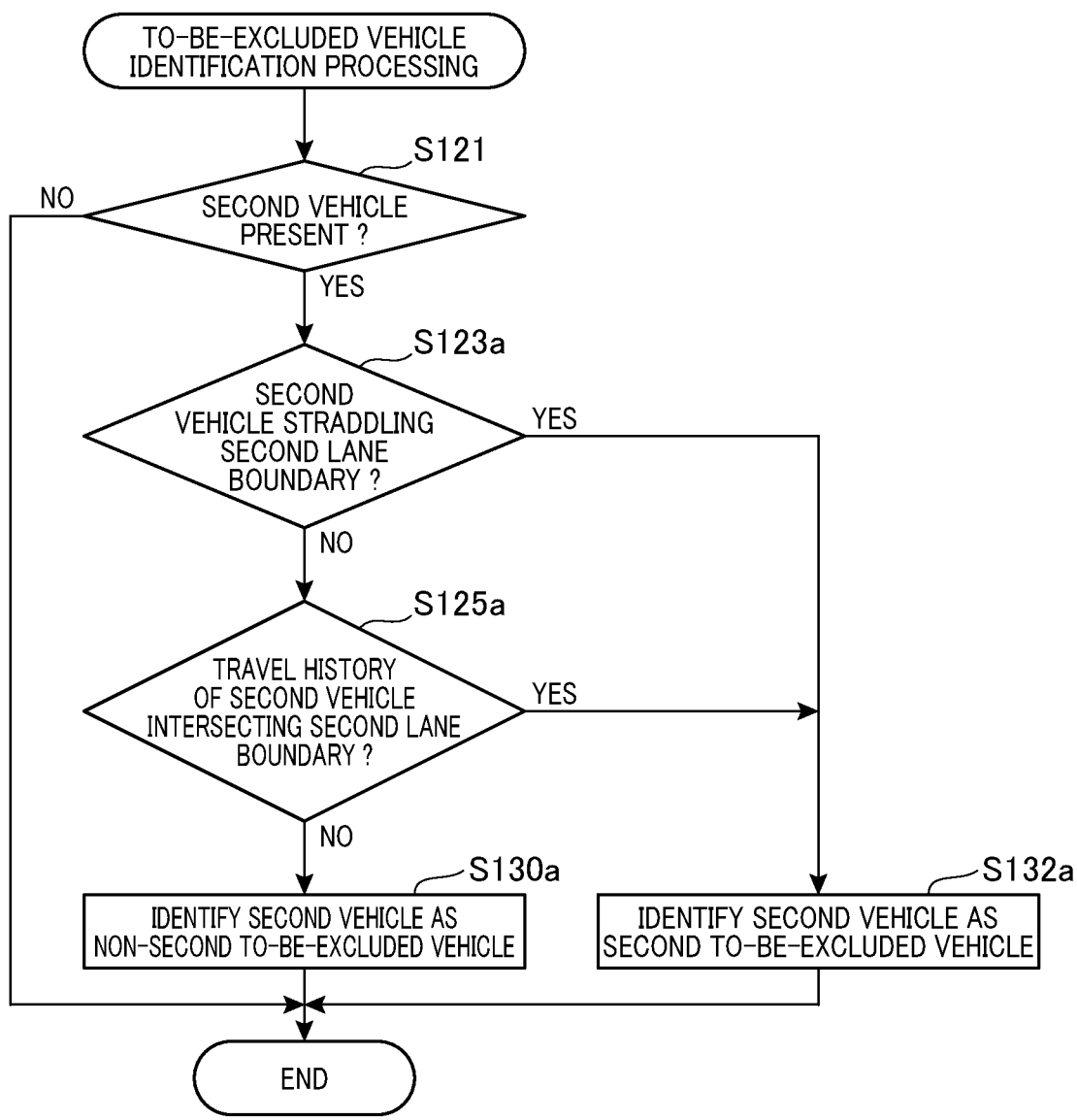
FIG. 19 is a flowchart of to-be-excluded vehicle identification processing according to a fourth modification to the first embodiment.

To-be-excluded vehicle identification processing shown in FIG. 19 is performed, provided that the second lane boundaries are already set. To-be-excluded vehicle identification processing shown in FIG. 19 is different from the to-be-excluded vehicle identification processing of the first modification in that step S123a, step S125a, step S132, and step S132a are included instead of step S123, step S125, step S130, step S132.

At step S123a, using a captured image acquired at the start of the current to-be-excluded vehicle identification processing, the to-be-excluded vehicle identifier 113 determines whether or not the second vehicle is straddling at least one second lane boundary 15 within the predetermined second distance D2 in the travel direction of the own vehicle 10. If the second vehicle is straddling none of the second lane boundaries 15 within the second distance D2 in the travel direction of the own vehicle 10, the process flow proceeds to step S125a.

At step S125a, the to-be-excluded vehicle identifier 113 determines whether or not the travel history of the second vehicle intersects at least one second lane boundary (already set) within the second distance D2 until the start of the current lane boundary setting processing after the end of the previous lane boundary setting processing. That is, at steps S123a and S125a, the to-be-excluded vehicle identifier 113 identifies the second vehicle that has crossed at least one second lane boundary until the start of the current lane boundary setting processing after the end of the previous lane boundary setting processing as a second to-be-excluded vehicle.

Figure 20:
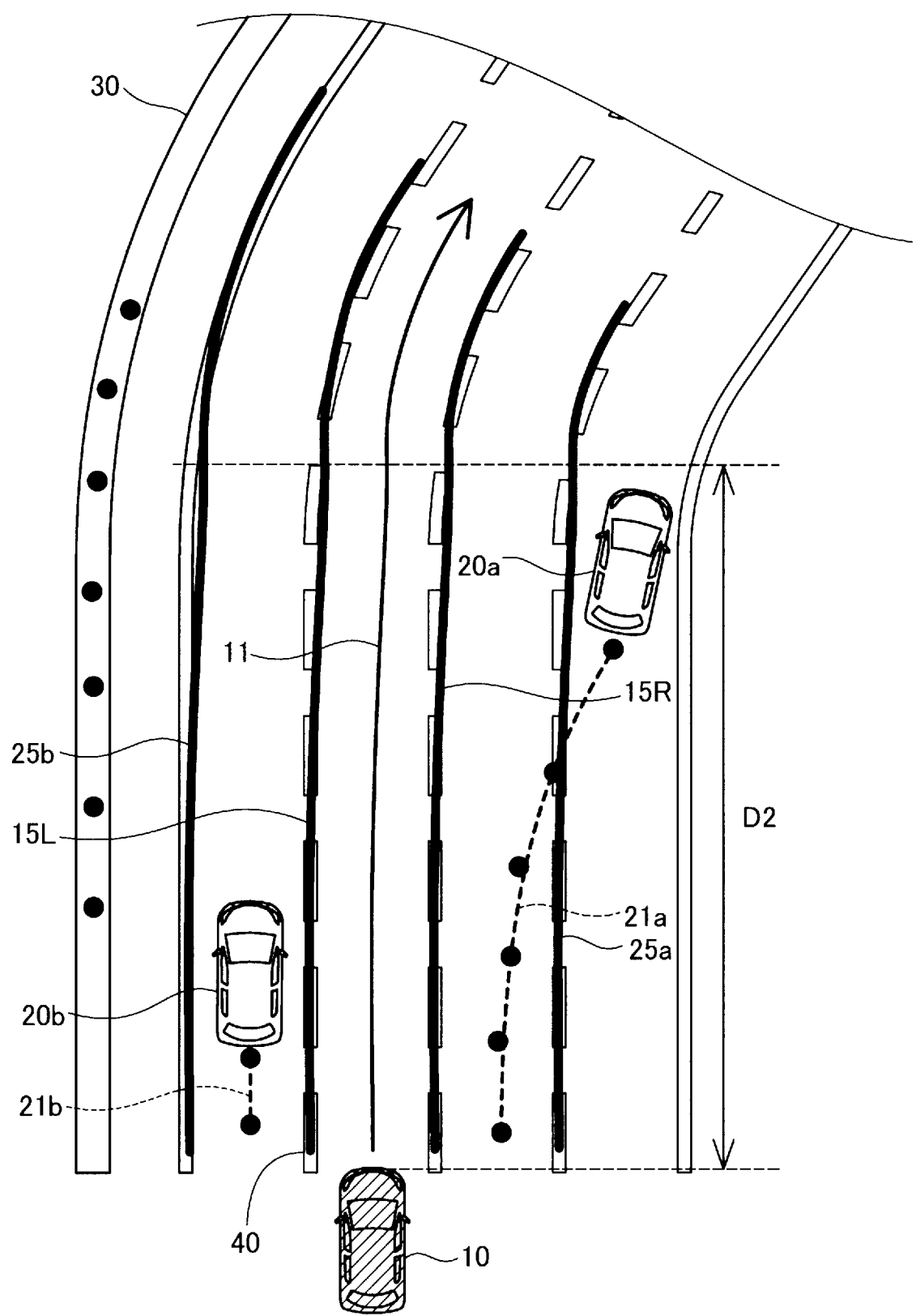
FIG. 20 is an example of another vehicle identified as a second to-be-excluded vehicle and another vehicle not identified as a second to-be-excluded vehicle.

If, as shown in FIG. 20, a travel history 21a of the second vehicle 20a intersects the second lane boundary 25a within the second distance D2, the process flow proceeds to step S132a, where the to-be-excluded vehicle identifier 113 identifies the second vehicle 20a as a second to-be-excluded vehicle. If, as shown in FIG. 20, a travel history 21b of the second vehicle 20b does not intersect the second lane boundary 25b, the process flow proceeds to step S130a, where the to-be-excluded vehicle identifier 113 does not identify the second vehicle 20b as a second to-be-excluded vehicle. In this way, the to-be-excluded vehicle identifier 113 performs the to-be-excluded vehicle identification processing using the second lane boundaries 25a, 25b set by the second lane boundary setter 116. Once a second to-be-excluded vehicle is identified, the reference line estimator 112 excludes the travel history of the second to-be-excluded vehicle from the recognition information in the lane boundary setting processing shown in FIG. 6 (see step S150 in FIG. 6), and estimates the reference line using the surroundings information having the travel history of the second to-be-excluded vehicle removed (see step S200 in FIG. 6).

In the present embodiment, the to-be-excluded vehicle identifier 113 identifies to-be-excluded vehicles using not only the first lane boundaries 15 set by the first lane boundary setter 114, but also the second lane boundaries 25a set by the second lane boundary setter 116, which enables more accurately setting the first lane boundaries 15.

F1. Fifth Modification

Figure 21:
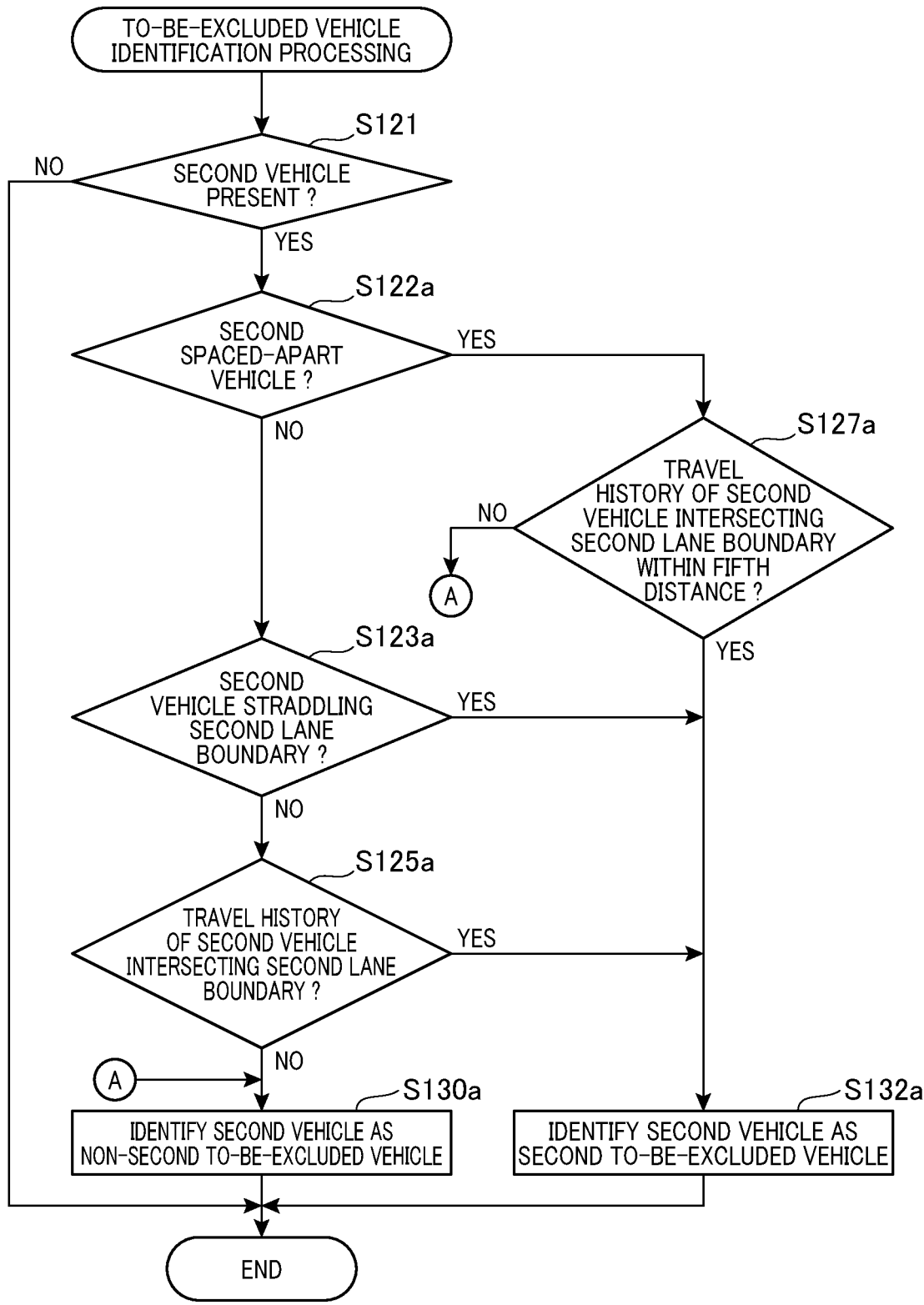
FIG. 21 is a flowchart of to-be-excluded vehicle identification processing according to a fifth modification to the first embodiment.

To-be-excluded vehicle identification processing shown in FIG. 21 is performed, provided that the second lane boundaries are already set by the second lane boundary setter 116. To-be-excluded vehicle identification processing shown in FIG. 21 is different from the to-be-excluded vehicle identification processing of the fourth modification (see FIG. 19) in that steps S122a and S127a are included. The other process steps are the same as in the fourth modification.

At step S122a, the to-be-excluded vehicle identifier 113 determines whether or not the detected second vehicle is a second spaced-apart vehicle. The second spaced-apart vehicle is a second vehicle located further than a fifth distance D5 from the own vehicle 10. In the present embodiment, the fifth distance D5 is equal to the third distance D3 and set to a distance that enables properly setting the second lane boundaries from a relationship between a processing speed of the road shape recognition apparatus 105a and the vehicle speed, plus some margin. The fifth distance D5 is determined by experiment or simulation. If it is determined at step S122a that the second vehicle is a second spaced-apart vehicle, then the process flow proceeds to step S127a. If it is determined at step S122a that the second vehicle is not a second spaced-apart vehicle, then the process flow proceeds to step S123a. Process steps S123a and S125a are performed in a similar manner as in the fourth modification and thus will not be redundantly described.

At step S127a, the to-be-excluded vehicle identifier 113 determines whether or not a travel history of the second spaced-apart vehicle intersects at least one second lane boundary within the fifth distance D5 until the start of the current lane boundary setting processing after the end of the previous lane boundary setting processing. If a travel history of the second spaced-apart vehicle intersects at least one second lane boundary within the fifth distance D5, the process flow proceeds to step S132a, where the to-be-excluded vehicle identifier 113 identifies the second spaced-apart vehicle as a second to-be-excluded vehicle. Once a second to-be-excluded vehicle is identified, the reference line estimator 112 excludes the travel history of the second to-be-excluded vehicle from the recognition information in the lane boundary setting processing shown in FIG. 6 (see step S150 in FIG. 6), and estimates the reference line using the surroundings information having the travel history of the second to-be-excluded vehicle removed (see step S200 in FIG. 6).

In the present embodiment, a second vehicle, of the second spaced-apart vehicles located further than the third distance D3 from the own vehicle 10, whose travel history intersect none of the second lane boundaries within the fifth distance D5 is not identified as a second to-be-excluded vehicle. Therefore, the reference line 11 can be estimated using travel histories of second vehicles, of the second spaced-apart vehicles, following the road shape, which can increase the estimation accuracy of the reference line.

Other Modifications

G1. Sixth Modification

In alternative embodiments to the above embodiments, the second lane boundary setter 116 may be configured to set a plurality of second lane boundaries outside each first lane boundary 15. More specifically, for each second lane boundary set at step S310 of FIG. 16, the second lane boundary setter 116 may be configured to, if there is a travel history of a vehicle other than the own vehicle, not identified as a to-be-excluded vehicle, on the opposite side of the second lane boundary set at step S310 from the first lane boundary 15, further set a second lane boundary at a fourth distance D4 from the second lane boundary set at step S310 in the vehicle-widthwise direction of the own vehicle. Alternatively or additionally, the second lane boundary setter 116 may be configured to, if there is a lane divider line 40 recognized by the surrounding environment recognizer 111 on the opposite side of the second lane boundary set at step S310 from the first lane boundary 15, further set, on the opposite side of the second lane boundary set at step S310 from the first lane boundary 15, a second lane boundary at a fourth distance D4 from the second lane boundary set at step S310 in the vehicle-widthwise direction of the own vehicle.

Figure 22:
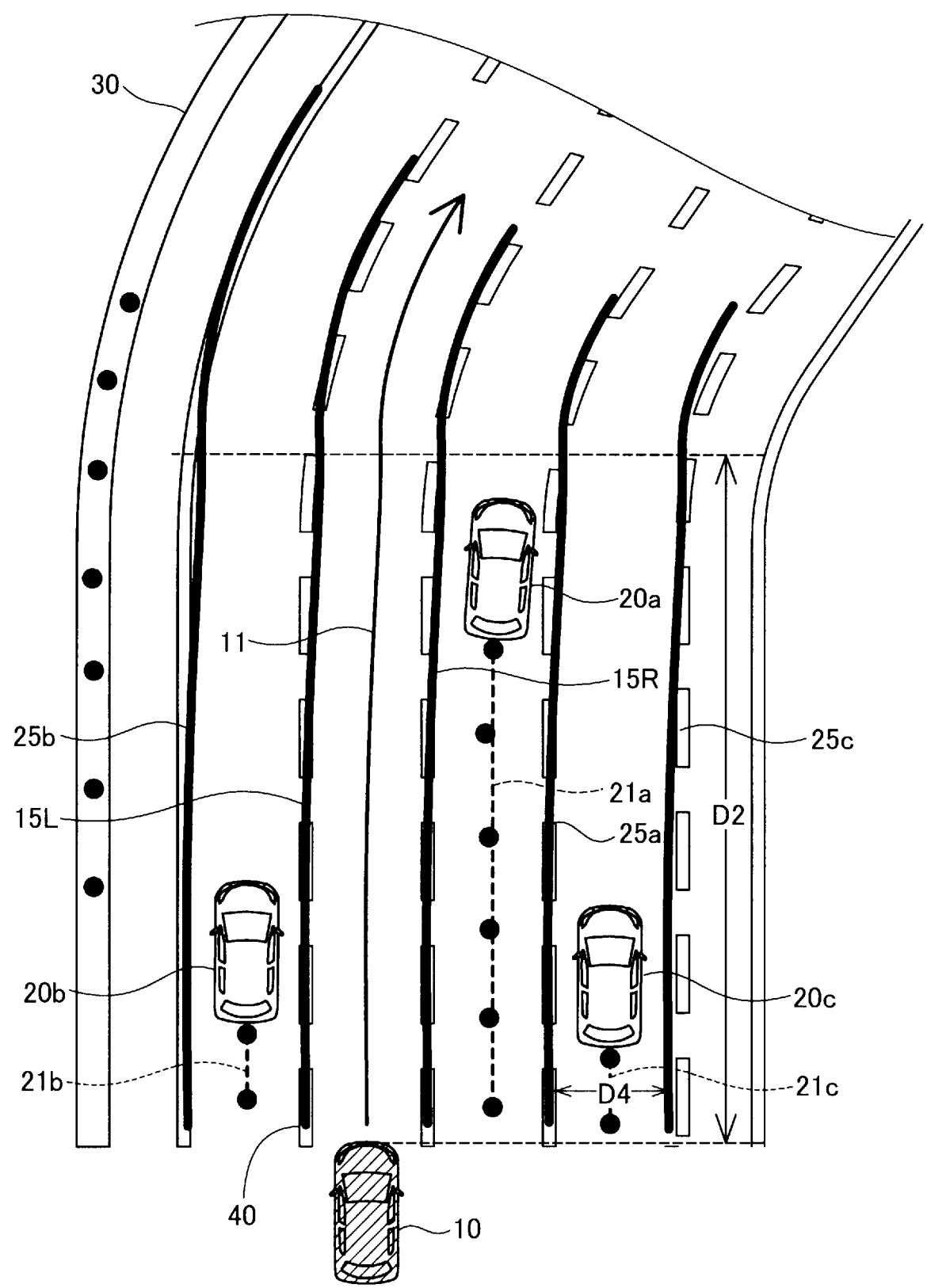
FIG. 22 is an example scenario where a plurality of second lane boundaries are set outside each first lane boundary according to a sixth modification to the first embodiment.

In an example of FIG. 22, there is a travel history 21c of the second vehicle 20c on the opposite side of the second lane boundary 25a from the first lane boundary 15R and outside the second lane boundary 25a in the vehicle-widthwise direction of the own vehicle 10. The second vehicle 20c is not identified as a to-be-excluded vehicle because the travel history 21c of the second vehicle 20c does not intersect the second lane boundary 25a within the second distance D2 from the own vehicle 10 in the travel direction. Thus, the second lane boundary setter 116 further sets a second lane boundary 25c to the right of the second lane boundary 25a.

With this configuration, a plurality of second lane boundaries can be set outside each first lane boundary in the vehicle-widthwise direction of the own vehicle.

G2. Seventh Modification

The sixth modification may be combined with the fourth or fifth modification. For example, the to-be-excluded vehicle identifier 113 may identify a second vehicle, of second vehicles located in the travel direction of the own vehicle 10, whose travel history does not follow the road shape as a to-be-excluded vehicle, using the first lane boundaries 15 and the plurality of second lane boundaries. In such an embodiment, the second lane boundary setter 116 estimates the reference line 11 using the surroundings information having travel histories of the first to-be-excluded vehicles identified using the first lane boundaries 15 and travel histories of the second to-be-excluded vehicles identified using the plurality of second lane boundary removed, which enables more accurately setting the first lane boundary 15.

G3. Eighth Modification

Figure 23:
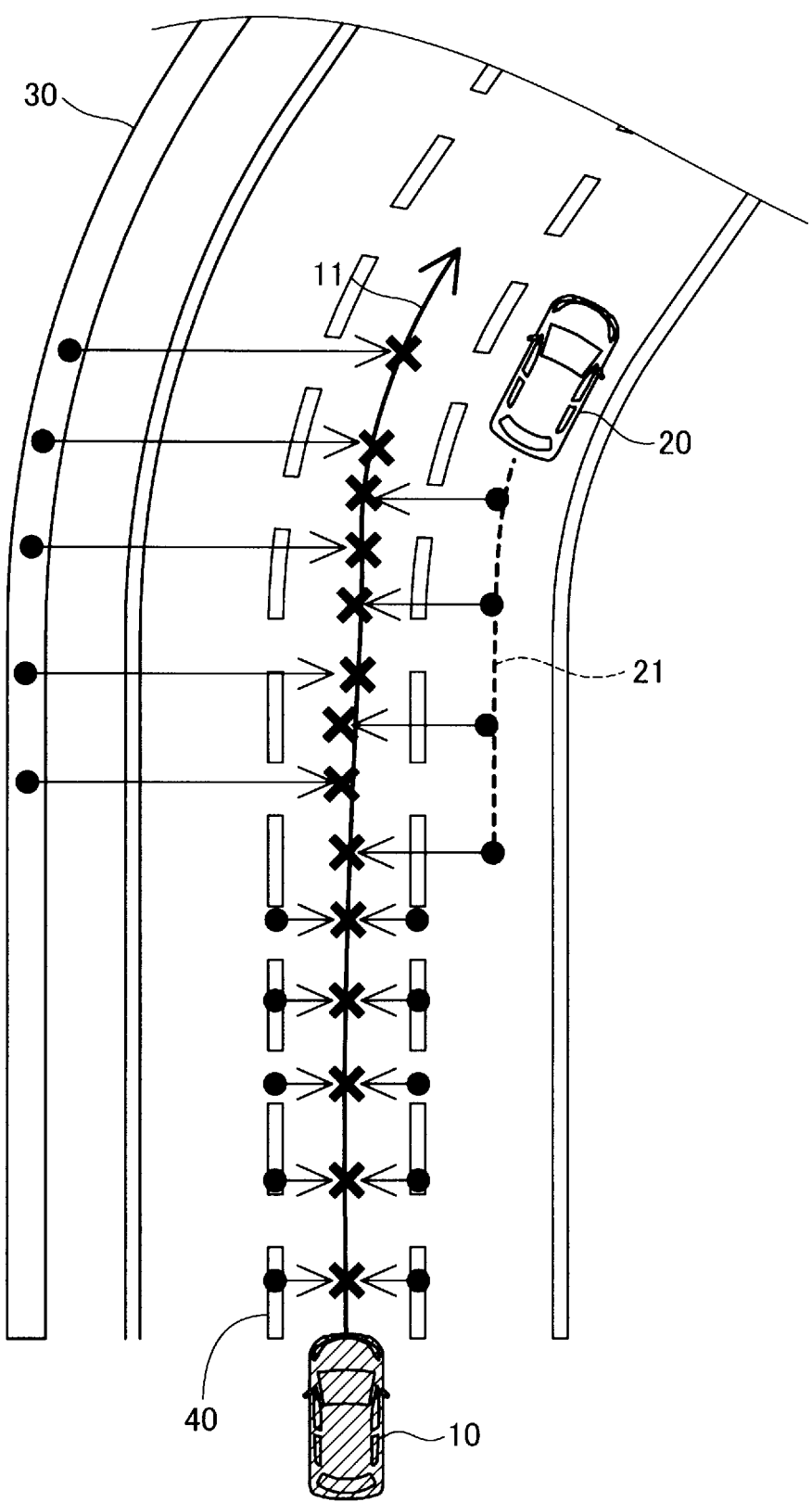
FIG. 23 is an example scenario where first lane boundaries are set using lane divider lines and a roadside object and a travel history of another vehicle according to an eighth modification to the first embodiment.

In alternative embodiments to the above embodiments, the surrounding environment recognizer 111 may be configured to recognize lane divider lines 40 on the road as surroundings information. If, as shown in an example of FIG. 23, lane divider lines 40 are recognized near the own vehicle 10, but are not recognized far from the own vehicle 10, the reference line estimator 112 may use lane divider lines 40 recognized near the own vehicle 10 and roadside objects 30 and travel histories 21 recognized from near to far to estimate a sequence of points, thereby estimating a reference line 11.

G4. Ninth Modification

Figure 24:
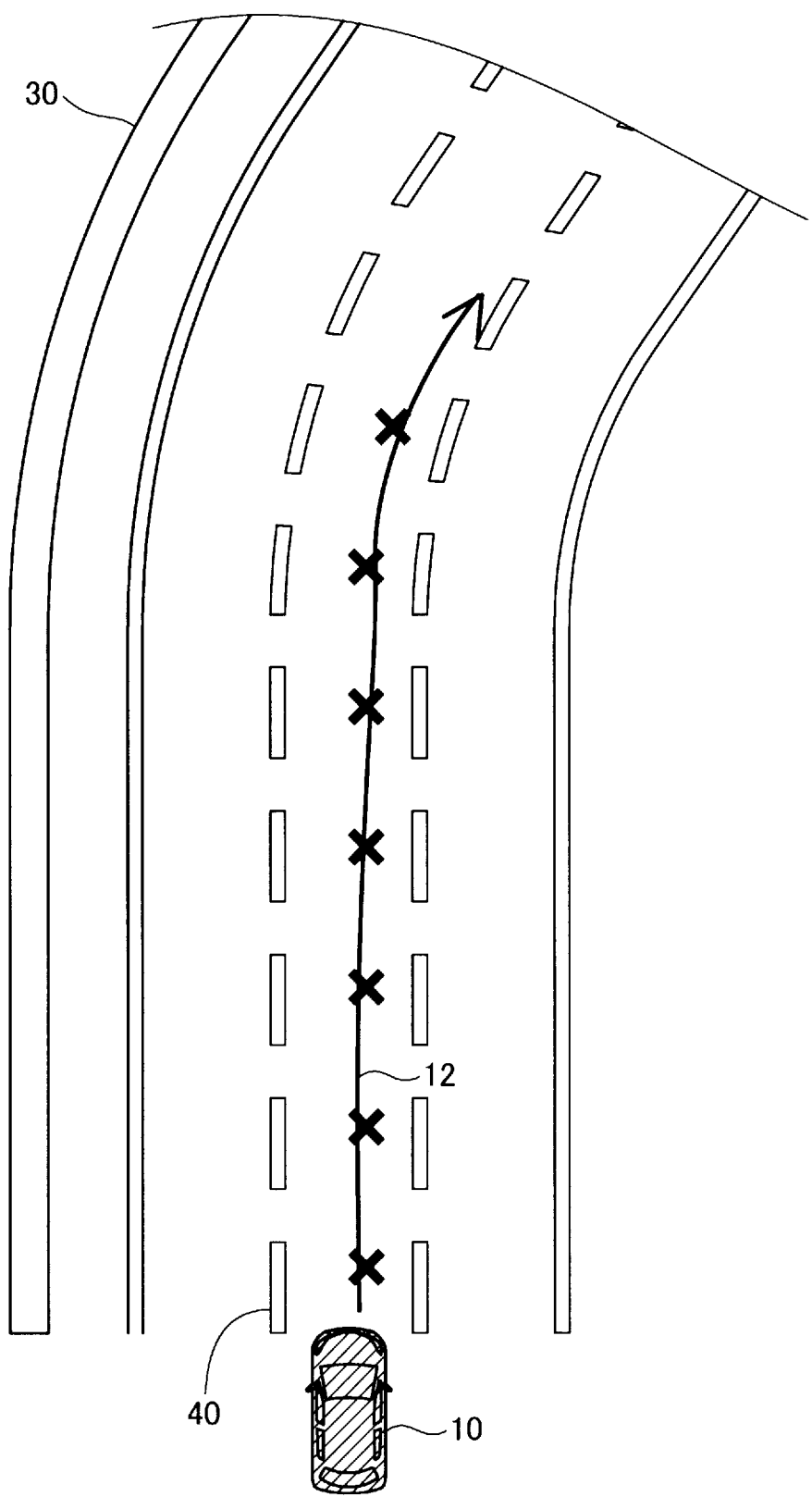
FIG. 24 is an example scenario where a reference line is estimated using map information according to a ninth modification to the first embodiment.

In alternative embodiments to the above embodiments, the surrounding environment recognizer 111 may be configured to, if none of roadside objects 30, a travel history of second vehicles, and lane divider lines 40 are not recognized as the surroundings information, the reference line estimator 112 may estimate a temporary reference line using a location of the own vehicle 10 detected by the GNSS and map information including coordinates of the sequence of points. The first lane boundary setter 114 may set first lane boundaries using the estimated temporary reference line. In this case, as shown in FIG. 24, the reference line estimator 112 may estimate a sequence of points using a location of the own vehicle 10 detected by the surroundings sensor 120 and map information acquired from the memory 117, 117a or acquired via communications with other devices, and estimate a temporary reference line 12 from the sequence of points. The first lane boundary setter 114 may set the temporary first lane boundaries using the temporary reference line 11a. A spacing between adjacent points of the sequence of points estimated using the map information may be greater than a spacing between adjacent points of the sequence of points estimated in the above embodiments. In addition, in some driving environments of the own vehicle 10, the accuracy of the location of the own vehicle 10 detected by the GNSS may be low. Thus, preferably, the reference line estimator 112 may be configured to, when roadside objects 30 or a travel history of the second vehicle become recognizable as the surroundings information at the surrounding environment recognizer 111, update the temporary reference line 12 with the temporary reference line 12 estimated using the roadside object 30 or the travel history of the second vehicle. With this configuration, driving of the own vehicle 10 is controlled using the temporary reference line 12 and the temporary first lane boundaries while none of roadside objects 30 and a travel history of the second vehicle are recognizable. When roadside objects 30 or a travel history of the second vehicle become recognizable, the reference line estimator 112 can more accurately set the first lane boundaries, thereby controlling driving of the own vehicle 10.

Another road shape recognition apparatus is known that calculates a road model representing a road shape of a travel route from edge points of lane divider lines on the road recognized by a camera and updates the road model as needed.

A technique for calculating a road model representing a road shape of a travel route from edge points of lane divider lines on the road recognized by a camera and updating the road model as needed, as disclosed in JP-A-2002-109695, calculates a road model using only edge points of lane divider lines near the own vehicle in cases where lane divider lines far from the own vehicle fail to be recognized due to the existence of an obstacle, such as a preceding vehicle or the like. This may cause a failure to accurately calculate the road model. In view of the foregoing, it is desired to have a technique for properly updating the road model.

A2. Second Embodiment

Figure 25:
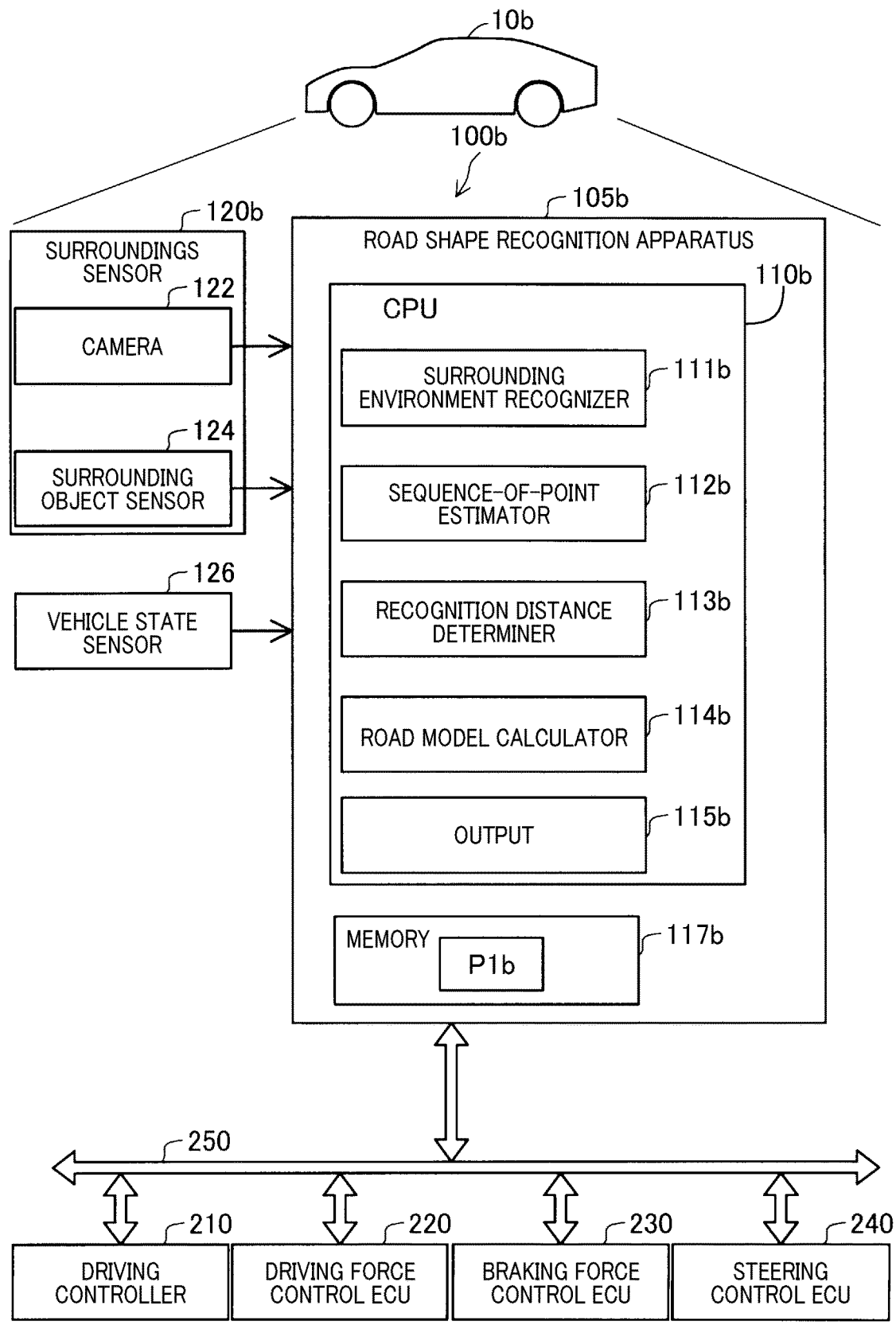
FIG. 25 is a schematic block diagram of an automatic driving system according to a second embodiment.

As shown in FIG. 25, an own vehicle 10b is equipped with an automatic driving control system 100b. In the present embodiment, the automatic driving control system 100b implements automatic driving of the own vehicle 10b. The own vehicle 10b can be manually driven by a driver. The automatic driving control system 100b includes a road shape recognition apparatus 105b, a surroundings sensor 120b, a vehicle state sensor 126, the driving controller 210, the driving force control ECU 220, the braking force control ECU 230, the steering control ECU 240. The road shape recognition apparatus 105b, the driving controller 210, the driving force control ECU 220, the braking force control ECU 230, and the steering control ECU 240 are connected to each other via an in-vehicle network 250.

The road shape recognition apparatus 105b includes, as functional blocks, a surrounding environment recognizer 111b, a sequence-of-point estimator 112b, a recognition distance determiner 113b, a road model calculator 114b, an output 115b. The road shape recognition apparatus 105b may be configured as a microcomputer including a central processing unit (CPU) 110b, a memory 117b, and an interface (not shown). Functions of these functional blocks can be implemented by the CPU 110b executing programs P1b stored in the memory 117b. Some or all of the functions may be implemented by hardware circuits.

The surrounding environment recognizer 111b recognizes surroundings information using detection signals from the surroundings sensor 120b. More specifically, the surrounding environment recognizer 111b recognizes, as surroundings information, at least one of shapes of lane divider lines on the road, shapes of roadside objects, travel histories of second vehicles detected by the surroundings sensor 120b. The sequence-of-point estimator 112b estimates a sequence of points representing a road shape of a travel route of the own vehicle 10b using the recognition information. The recognition distance determiner 113b determines a recognition distance (or a recognizable distance) that is a distance from the own vehicle 10b to the most-distant one of the sequence of points estimated by the sequence-of-point estimator 112b in the travel direction of the own vehicle 10b. The road model calculator 114b calculates a road model that represents a road shape with a continuous line using the surroundings information. The road model calculator 114b calculates a road model using Kalman filters, a least squares method or the like. The output 115b outputs the road model calculated by the road model calculator 114b to the driving controller 210 via the in-vehicle network 250.

The surroundings sensor 120b includes a camera 122 and a surrounding object sensor 124. The camera 122 images around the own vehicle 10b to acquire images of surroundings of the own vehicle 10b. The surrounding object sensor 124 detects surroundings of the own vehicle 10b. The surrounding object sensor 124 is an object sensor, such as a laser radar, a millimeter-wave radar, an ultrasonic sensor or the like, using reflected waves.

In the present embodiment, the surrounding environment recognizer 111b detects, from the images captured by the camera 122 and a result of detection by the surrounding object sensor 124, a left and a right lane divider line of a lane in which the own vehicle 10b is traveling and their locations, the presence or absence of a roadside object and its location, the presence or absence of a second vehicle and its location, size, distance from the own vehicle, travel direction, travel speed, yaw rate and the like. The surrounding environment recognizer 111b may detect some or all of these types of information.

The vehicle state sensor 126 includes a vehicle speed sensor and a yaw rate sensor. The vehicle state sensor 126 detects, as a state of the own vehicle 10b, a travel speed and a yaw rate of the vehicle 10b.

The driving controller 210 is configured as a microcomputer including a central processing unit (CPU), a random access memory (RAM), a read only memory (ROM), and an interface (not shown). An automatic driving function may be implemented by the CPU of the driving controller 210 executing programs already installed. The driving controller 210 controls the driving force control ECU 220, the braking force control ECU 230, and the steering control ECU 240 using, for example, the road model calculated by the road model calculator 114b.

The driving force control ECU 220 is an electronic control unit (ECU) that controls an actuator to generate vehicle driving forces. During manual driving of the vehicle, the driving force control ECU 220 controls a power source, such as an engine or an electric motor, in response to an amount of depression of an accelerator pedal. During automatic driving of the vehicle, the driving force control ECU 220 controls the power source in response to a requested driving force calculated by the driving controller 210.

The braking force control ECU 230 is an electronic control unit (ECU) that controls a brake actuator to generate vehicle braking forces. During manual driving of the vehicle, the braking force control ECU 230 controls the brake actuator in response to an amount of depression of a brake pedal. During automatic driving of the vehicle, the braking force control ECU 230 controls the brake actuator in response to a requested braking force calculated by the driving controller 210.

The steering control ECU 240 is an electronic control unit (ECU) that controls a motor to generate vehicle steering torques. During manual driving of the vehicle, the steering control ECU 240 controls the motor in response to a steering maneuver to generate a steering assistance torque. This can assist the driver in steering the vehicle with a small amount of force. During automatic driving of the vehicle, the steering control ECU 240 controls the motor in response to a requested steering angle calculated by the driving controller 210, thereby steering the vehicle.

Figure 26:
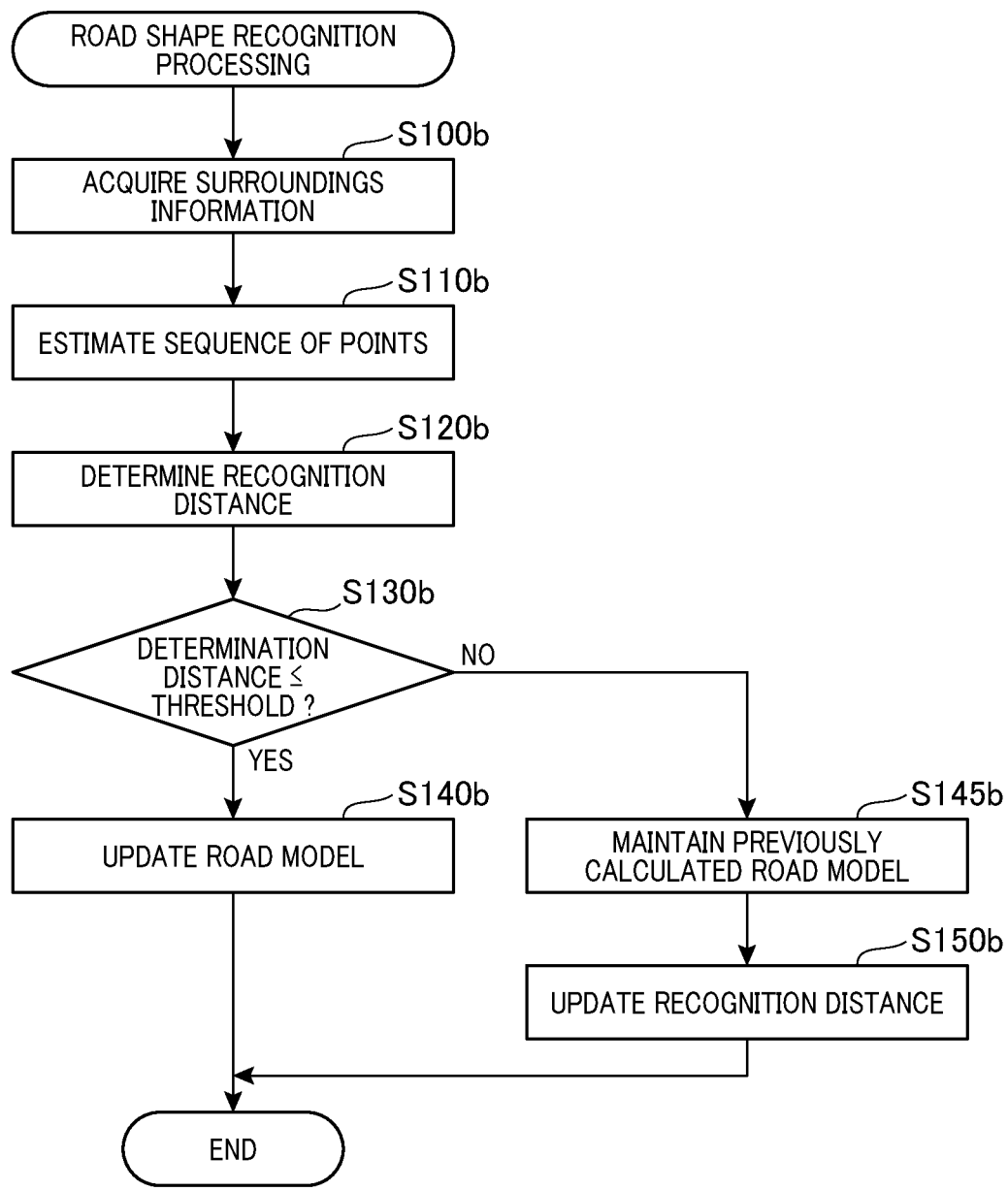
FIG. 26 is a flowchart of road shape recognition processing according to the second embodiment.

Road shape recognition processing as shown in FIG. 26 includes a series of process steps that enable the road model calculator 114b to determine a road model for a travel route of the own vehicle 10b. This road shape recognition processing is performed by the road shape recognition apparatus 110b every predetermined time period, for example, every 100 milliseconds, during traveling of the own vehicle 10b.

At step S100b, the sequence-of-point estimator 112b acquires surroundings information. More specifically, the sequence-of-point estimator 112b acquires surroundings information from images of surroundings of the own vehicle 10b captured by the camera 122 and surroundings of the own vehicle 10b detected by the surrounding object sensor 124.

At step S110b, the sequence-of-point estimator 112b estimates a sequence of points representing a road shape using the surroundings information acquired at step S100b. More specifically, the sequence-of-point estimator 112b estimates coordinate locations of the sequence of points using a shape of each lane divider line, a shape of each roadside object, and a travel history of each second vehicle detected by the surroundings sensor 120b. In the present embodiment, the sequence-of-point estimator 112b estimates a sequence of points from the shape of each lane divider line.

Subsequently, at step S120b, the recognition distance determiner 113b determines a recognition distance that is a distance from the own vehicle 10b to the most-distant one of the sequence of points estimated at step S110b.

Figure 27:
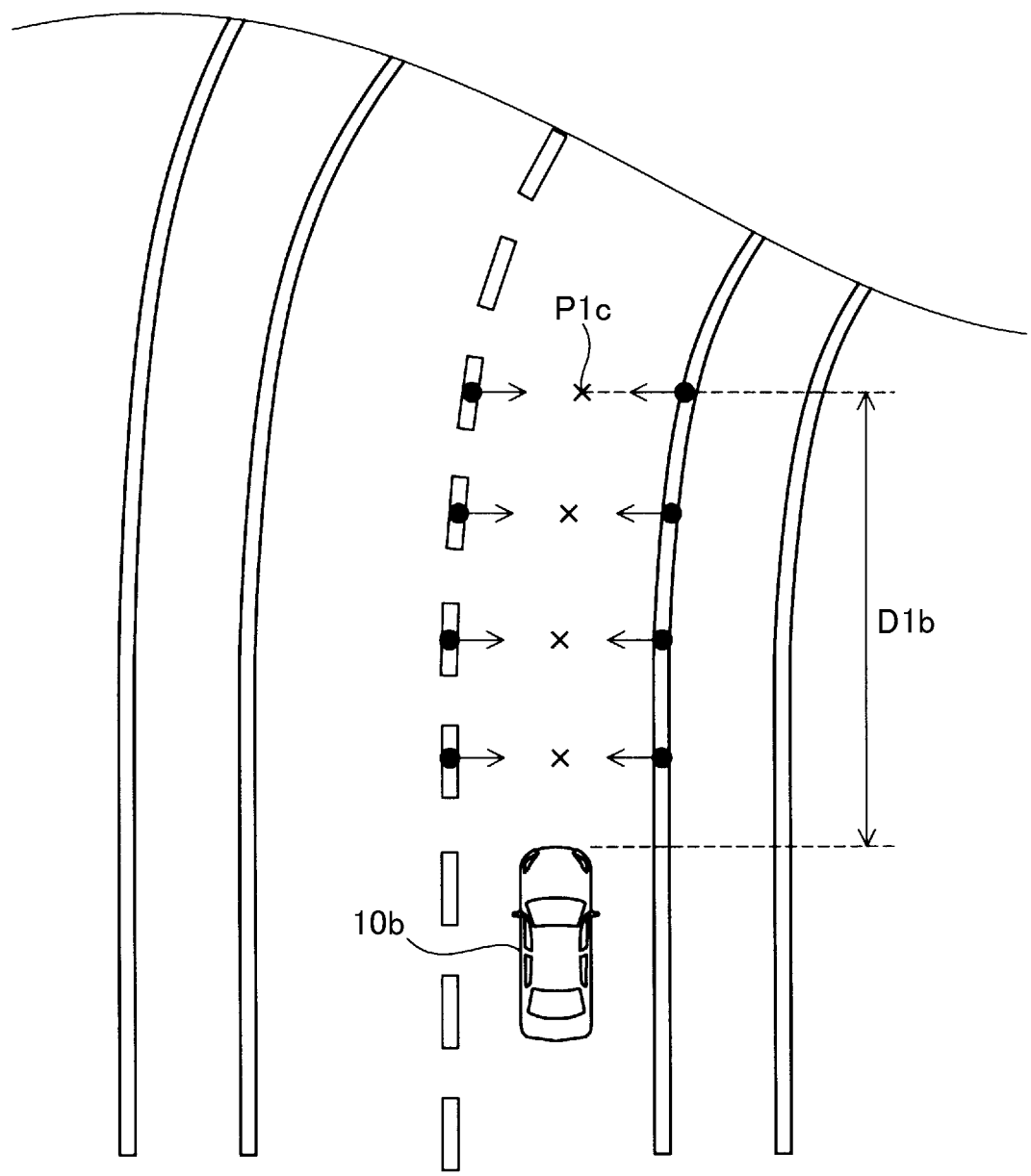
FIG. 27 is an example of a sequence of points.
Figure 28:
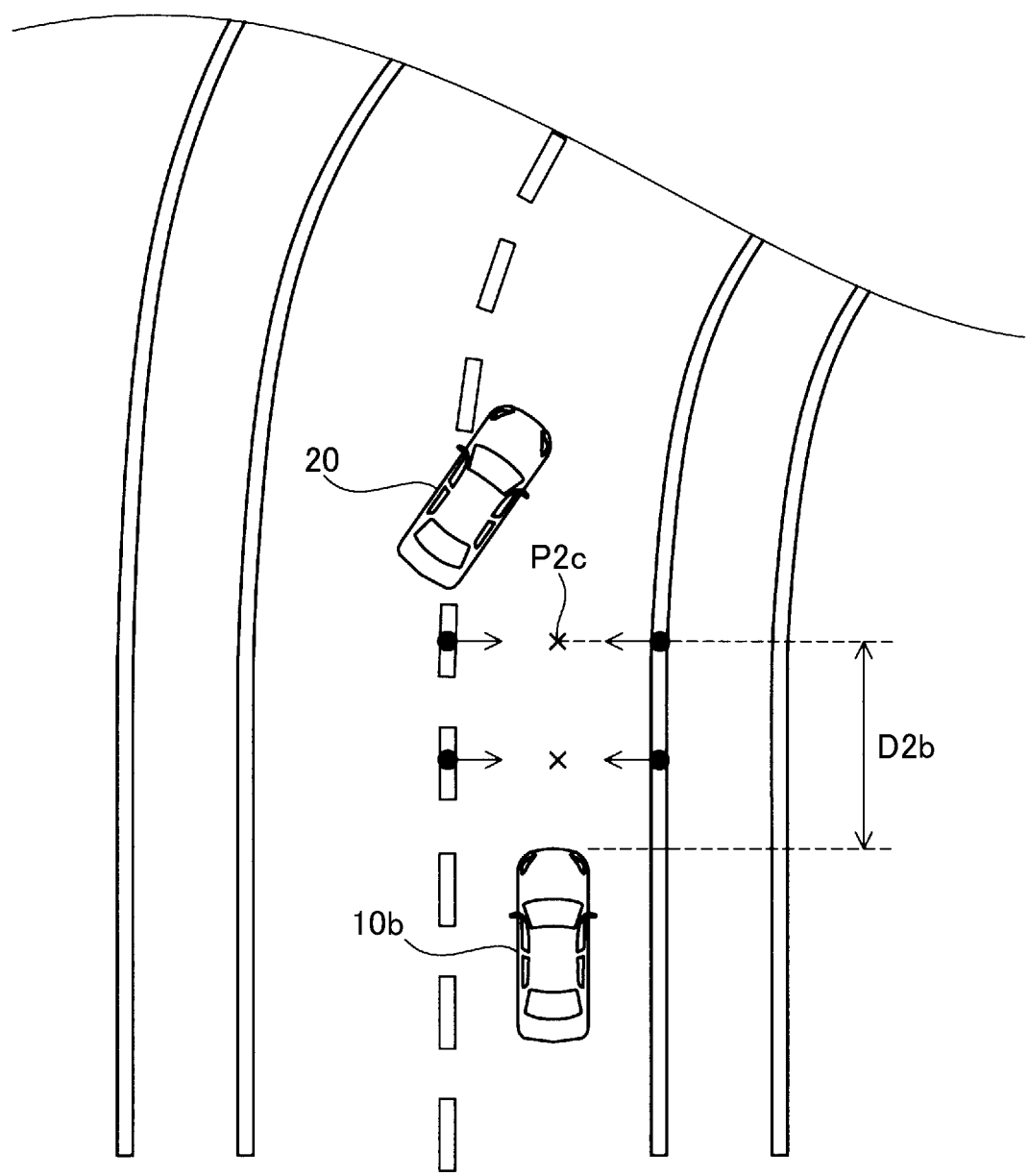
FIG. 28 is another example of a sequence of points.

As shown in FIGS. 27 and 28, the sequence of points estimated by the sequence-of-point estimator 112b at step S110b are indicated by "x" marks. In FIG. 27, the most-distant point from the own vehicle 10b, of the sequence of points, is located at P1c. The recognition distance is a distance D1b. If, as shown in FIG. 28, part of the divider line fails to be detected due to a lane change made by, for example, the preceding vehicle 20, the most-distant point from the own vehicle 10b, of the sequence of points, is located at P2c, where the recognition distance D2b is less than the distance D1b.

Figure 29:
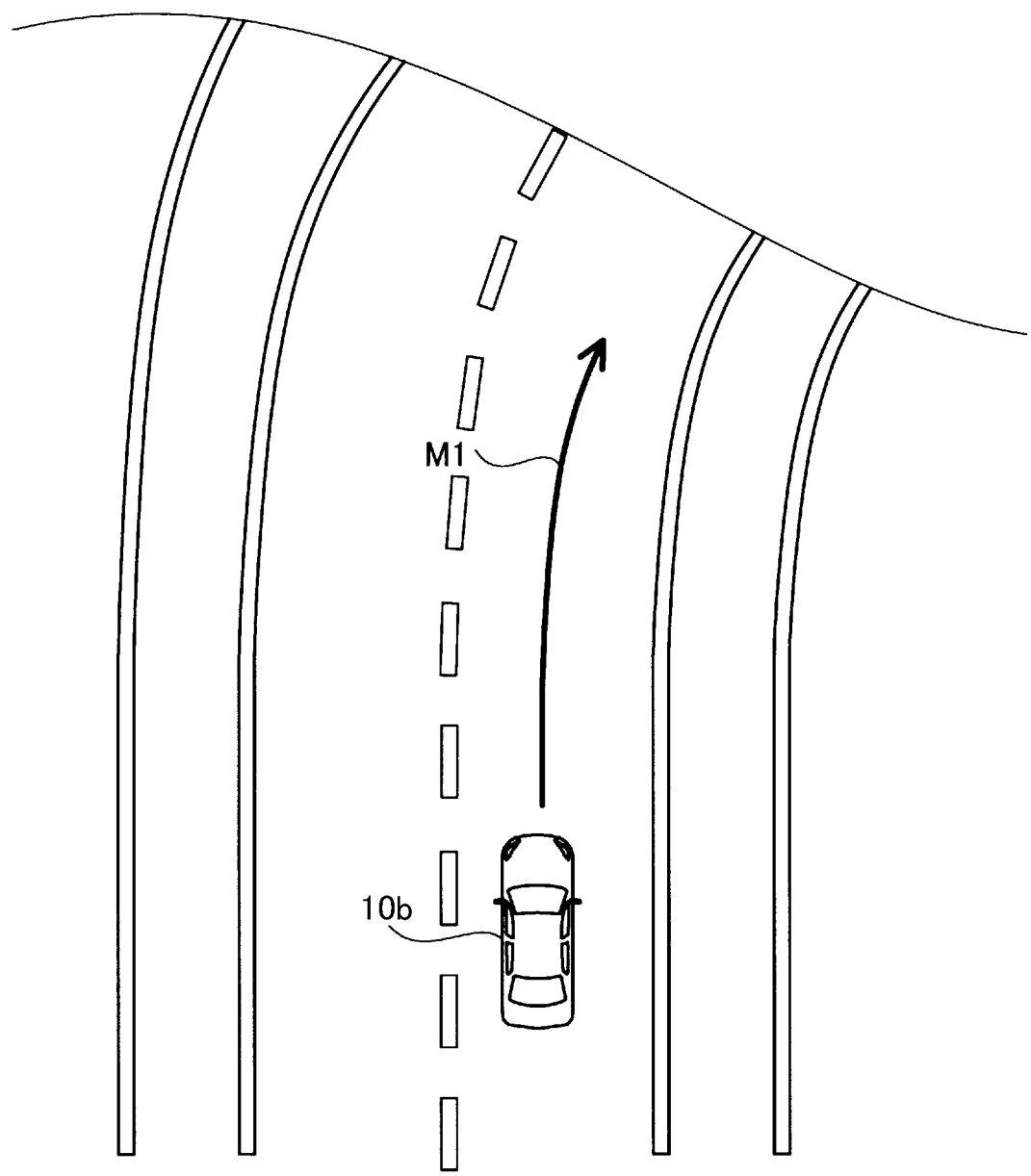
FIG. 29 is an example of a road model.

Subsequently, at step S130b (see FIG. 26), the road model calculator 114b determines whether or not a difference between the recognition distance currently determined at step S120b and the previously determined recognition distance (such a difference being hereinafter referred to as a determination distance) is equal to or less than a predetermined threshold distance. The determination distance takes a positive value if the previously determined recognition distance is greater than the recognition distance determined at step S120b, and a negative value if the previously determined recognition distance is less than the recognition distance determined at step S120b. The threshold distance may be pre-determined experimentally. If the determination distance is equal to or less than the threshold distance, the process flow proceeds to step S140b. The road model calculator 114b calculates a road model M1 as shown in FIG. 29 and updates the previously calculated road model. If the determination distance is greater than the threshold distance, that is, if the recognition distance is shorter than the previously determined recognition distance by the threshold distance or more, the process flow proceeds to step S145b (see FIG. 26), where the road model calculator 114b maintains the previously calculated road model without updating the previously calculated road model. Then, the process flow proceeds to step S150b. The previously calculated road model means the road model calculated at step S140b in the previous road shape recognition processing or the road model maintained at step S145b in the previous road shape recognition processing. That is, in the present embodiment, the road model calculator 114b maintains the previously calculated road model until the determination distance exceeds the threshold distance.

At step S150b, the recognition distance determiner 113b updates the previously determined recognition distance. More specifically, the recognition distance determiner 113b subtracts a traveled distance of the own vehicle 10b from the previously determined recognition distance. The traveled distance of the own vehicle 10b can be calculated according the following equation (1) or (2).

$$D = v \times CT \quad (1)$$

$$D = v \times CT + \tfrac{1}{2} \times a \times CT^2 \quad (2)$$

where "D" represents a traveled distance of the own vehicle 10b, "v" represents a travel speed of the own vehicle 10b, "CT" represents the predetermined time period (in seconds) in which the road shape recognition processing repeats, and "a" represents an acceleration of the own vehicle 10b.

In the road shape recognition apparatus 105b of the present embodiment described above, the road model calculator 114b is configured to, if a difference between the recognition distance and the previously determined recognition distance is equal to or less than the threshold distance, update the previously calculated road model to the road model M1 currently calculated using the surroundings information, and if the difference between the recognition distance and the previously determined recognition distance is greater than the threshold distance, withhold updating the previously calculated road model. More specifically, if part of a lane divider line fails to be detected due to a preceding vehicle straddling the lane divider line, resulting in a failure to acquire surroundings information, the previously calculated road model is not updated. The previously calculated road model is to be updated only if lane divider lines are successfully detected and surroundings information is thereby successfully acquired. This configuration enables properly updating the road model.

The recognition distance determiner 113b is configured to, if a difference between the recognition distance and the previously determined recognition distance is greater than the threshold distance, update the previously determined recognition distance to the previously determined recognition distance minus the traveled distance, which enables accurately determining a relationship between the determination distance and the threshold distance in the subsequent road shape recognition processing. In some alternative embodiments, the process step S150b in FIG. 26 may be skipped.

Modifications

Several modifications to the second embodiment set forth above will now be described.

B2. First Modification

Figure 30:
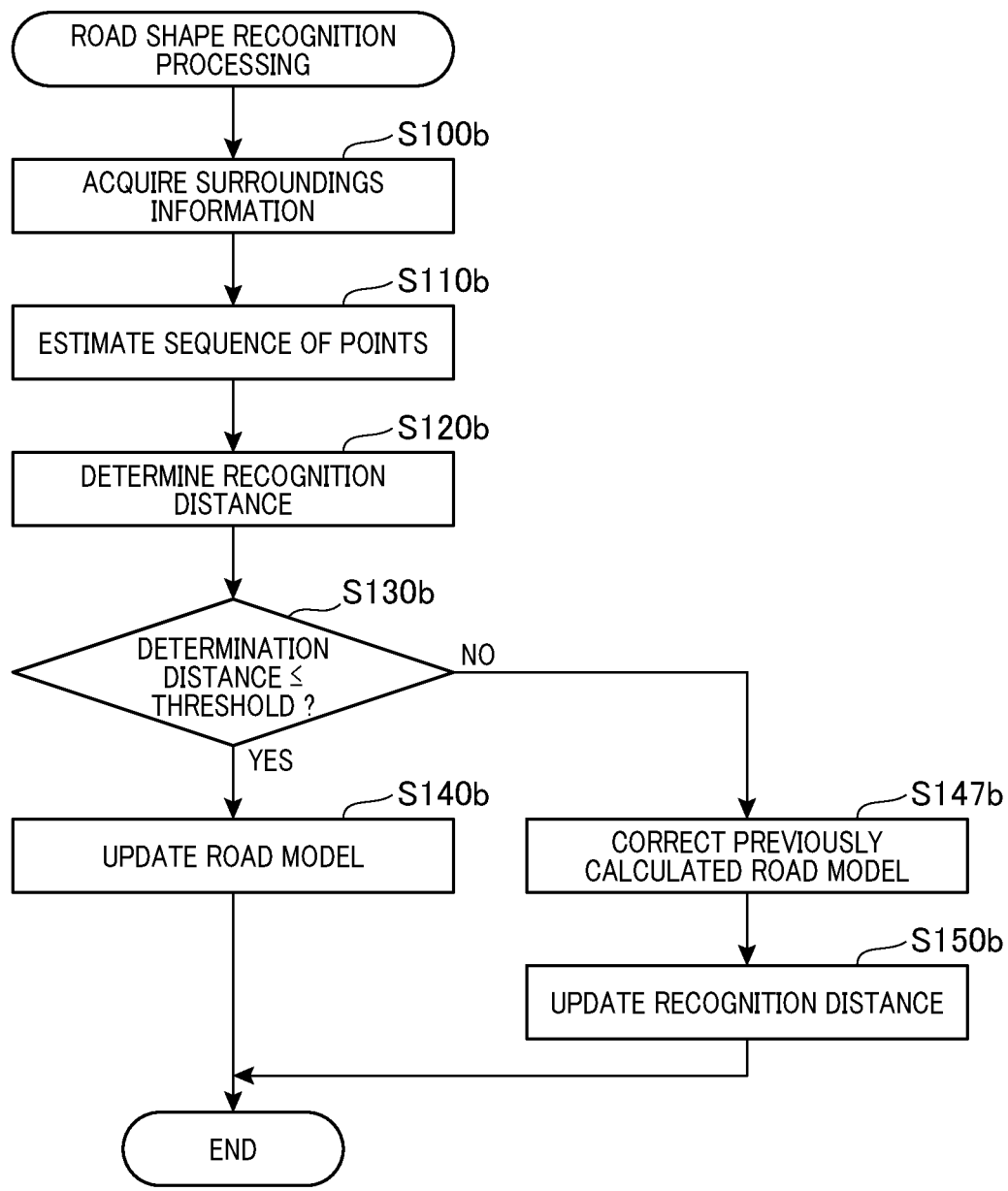
FIG. 30 is a flowchart of road shape recognition processing according to a first modification to the second embodiment.

Road shape recognition processing of a first modification to the second embodiment as shown in FIG. 30 is different from that of the second embodiment in that step S147b is included instead of step S145b. The other process steps are the same as in the second embodiment. The automatic driving control system of the first modification is similar in configuration to that of the second embodiment and thus duplicate description will be omitted.

Figure 31:
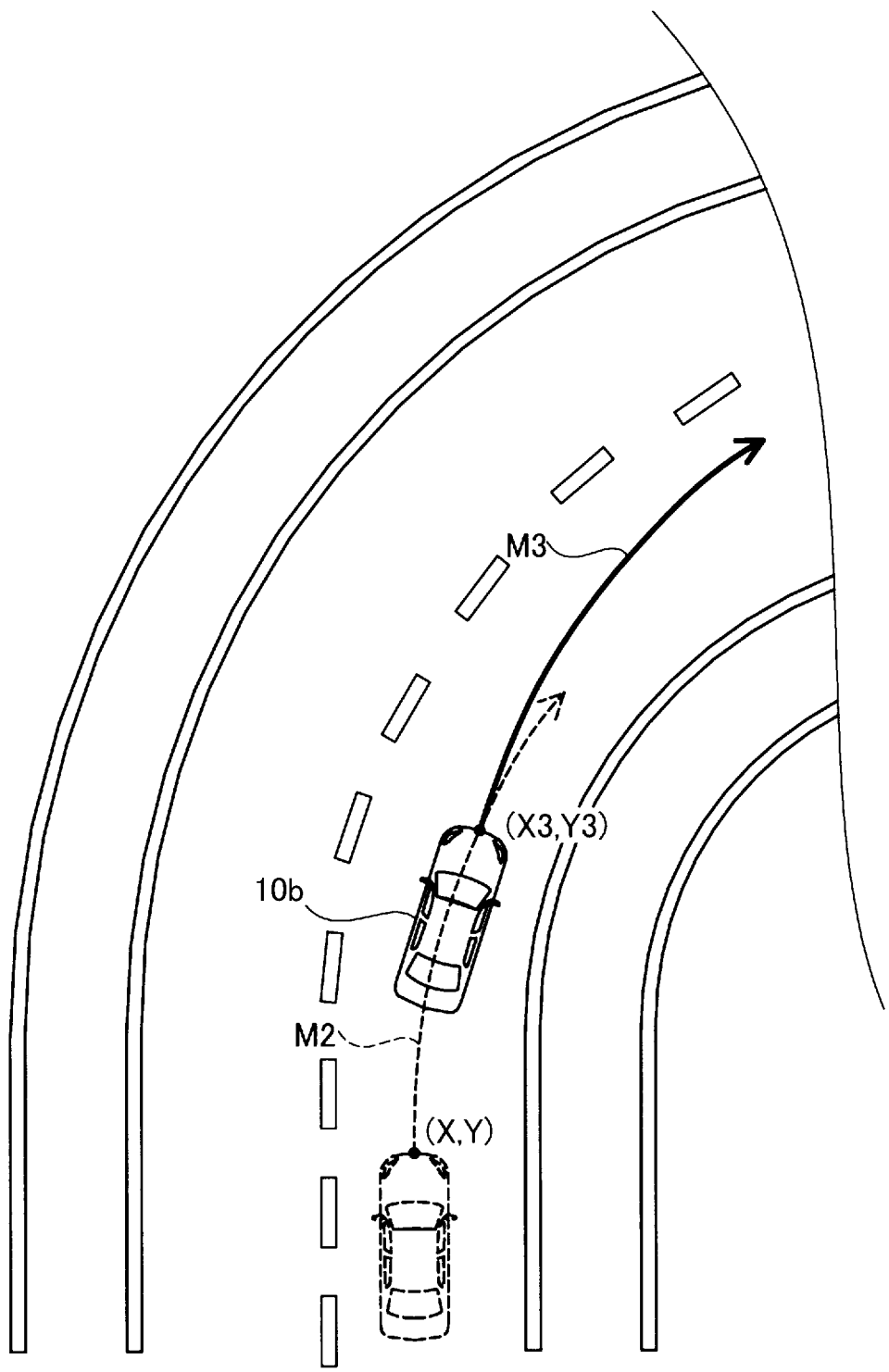
FIG. 31 is a comparative example of maintaining the previously calculated road model.
Figure 32:
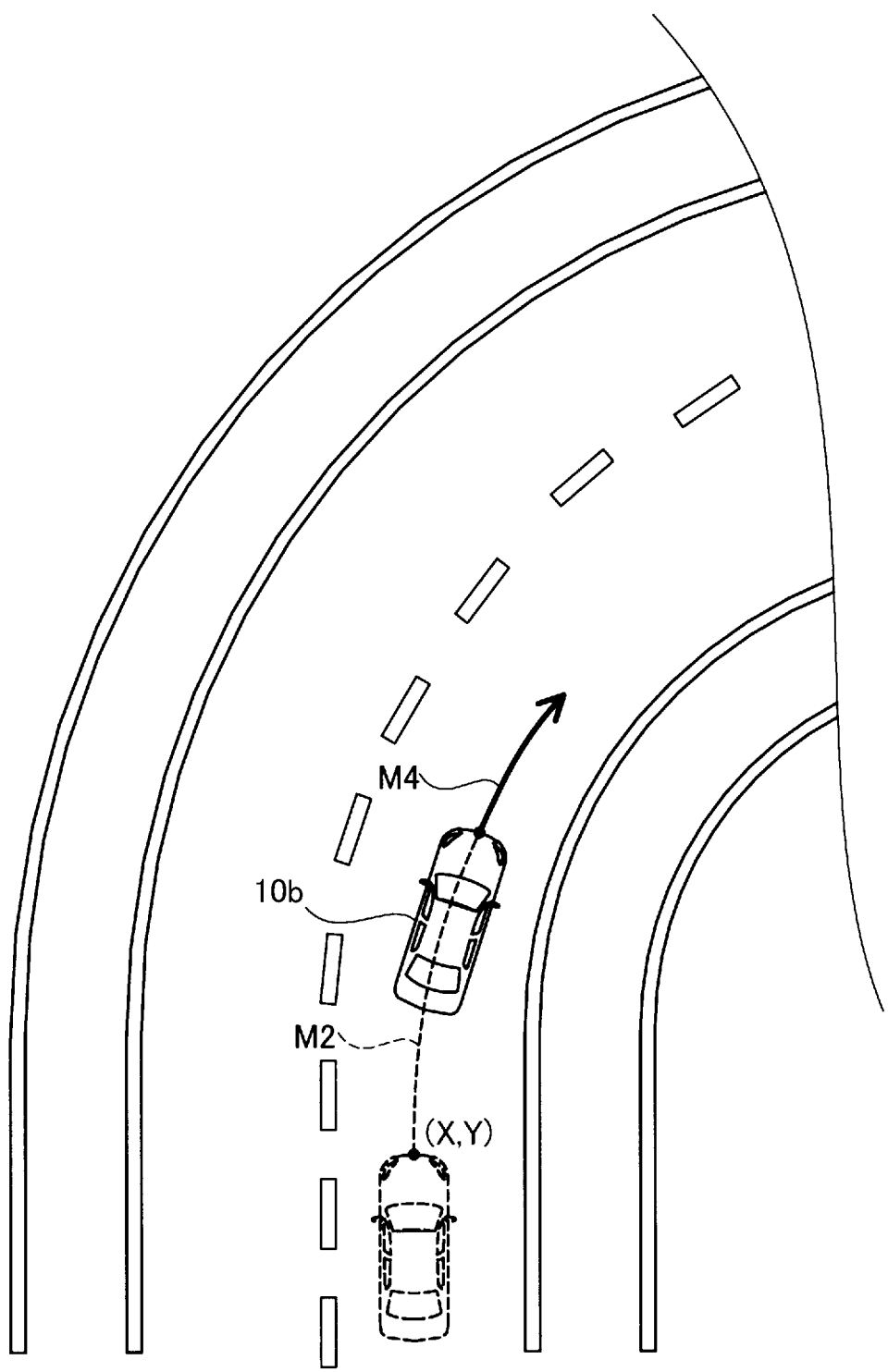
FIG. 32 is an example of a corrected road model.

In the first modification, at step S147b, the road model calculator 114b corrects the previously calculated road model. More specifically, the road model calculator 114b corrects the previously calculated road model using at least a travel speed and a yaw rate of the own vehicle 10b detected by the vehicle state sensor 126. In FIG. 31, the previously calculated road model M2 is indicated by a broken line, and a road model M3 defined by maintaining the previously calculated road model is indicated by a continuous line. In FIG. 32, the previously calculated road model M2 is indicated by a broken line, and a corrected road model M4 is indicated by a continuous line. The road model M3 is a road model represented by the same function as the previously calculated road model road model M2, except that the starting point of the road model is shifted from coordinates (X, Y) of a location of the front edge center of the own vehicle 10b at the time when the road model M2 was calculated to coordinates (X3, Y3) of the current location of the front edge center of the own vehicle 10b. The road model M3 is corrected to the road model M4 using a travel speed and a yaw rate of the own vehicle 10b as shown in FIG. 32, such that the road model M4 follows a road shape better than the road model M3. More specifically, for example, the road model calculator 114b calculates an amount of translational movement and an amount of rotational movement per cycle of the road shape recognition processing using the travel speed and the yaw rate of the own vehicle 10b, and applies the amount of translation and the amount of rotational movement to the road model M2, thereby calculating the road model M4.

In the road shape recognition apparatus 110b of the present embodiment, the road model calculator 114b is configured to, if a difference between the recognition distance and the previously determined recognition distance is greater than the threshold distance, correct the previously calculated road model M2 using the travel speed and the yaw rate of the own vehicle 10b detected by the vehicle state sensor 126. Therefore, for example, even if part of a lane divider line fails to be detected due to a preceding vehicle straddling the lane divider line, resulting in a failure to acquire surroundings information, the previously calculated road model is corrected to reflect the movement of the own vehicle 10b, which enables more properly updating the road model.

C2. Second Modification

Figure 33:
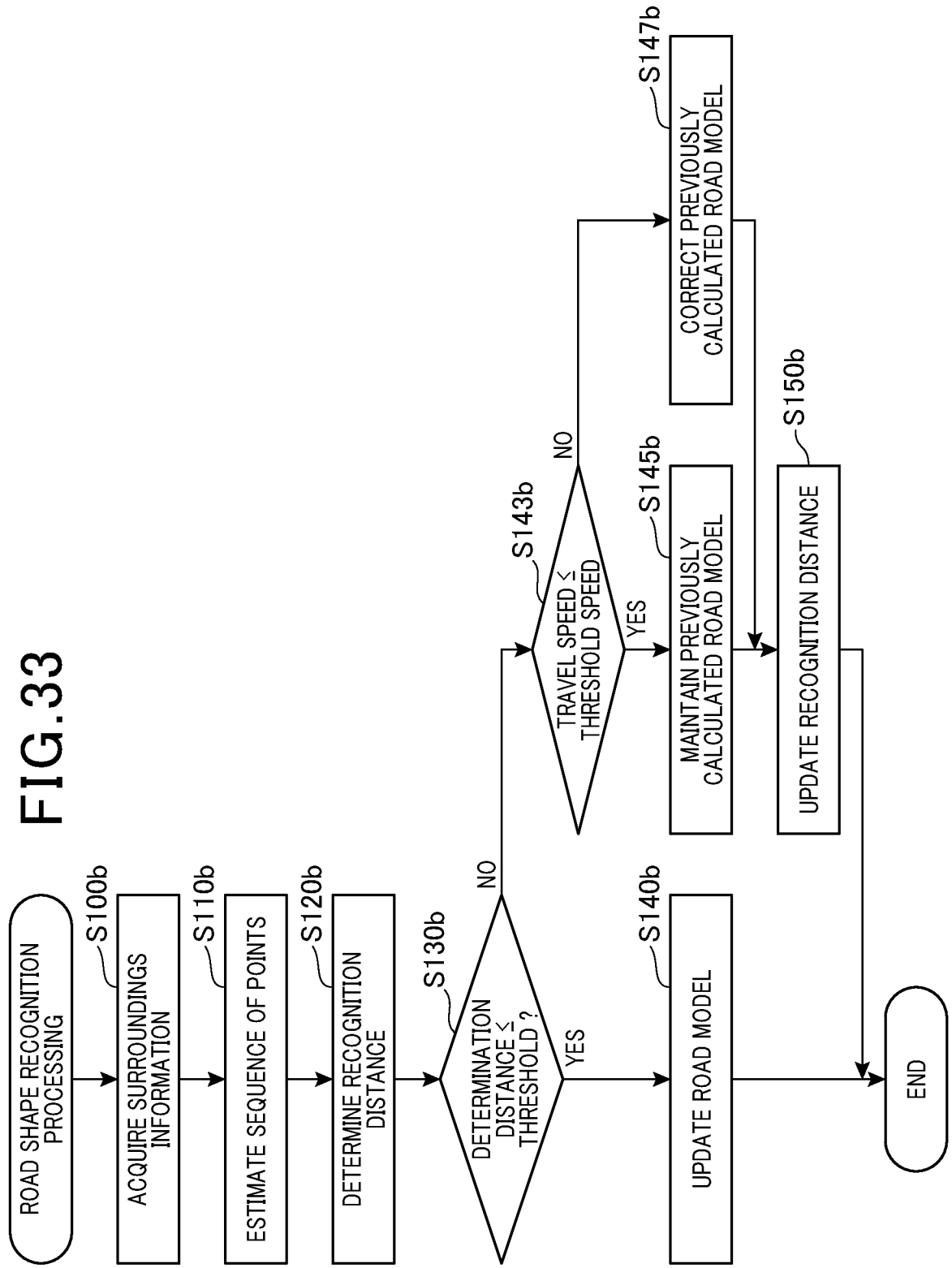
FIG. 33 is a flowchart of road shape recognition processing according to a second modification to the second embodiment.

Road shape recognition processing of a second modification as shown in FIG. 33 is different from that of the second embodiment in that, if the determination distance is greater than the threshold distance, a determination is made as to whether to maintain the previously calculated road model in response to a travel speed of the own vehicle 10b. The other process steps are the same as in each of the second embodiment and the first modification. The automatic driving control system of the second modification is similar in configuration to that of the second embodiment and thus duplicate description will be omitted.

In the second modification, if it is determined at step S130b that the determination distance is greater than the threshold distance, then at step S143b the road model calculator 114b determines whether or not the travel speed is less than a predetermined threshold speed. This threshold speed, which may be pre-determined experimentally, is within a low speed range (e.g., a range of 5-10 km/h). If the travel speed is less than the threshold speed, then step S145b the road model calculator 114b maintains the previously calculated road model. Similarly to the first modification, if the travel speed is equal to or greater than the threshold speed, then at step S147b the road model calculator 114b corrects the previously calculated road model as in the first modification.

In the road shape recognition apparatus 105b of the present embodiment set forth above, the previously calculated road model is corrected if it is determined that the determination distance is greater than the threshold distance and the travel speed of the own vehicle 10b is equal to or greater than the threshold speed. A small amount of change in yaw rate occurs when the own vehicle 10b is traveling at a low speed, which may cause the surroundings sensor 120b to fail to determine whether or not such a small amount of change in yaw rate is noise. Therefore, if the travel speed of the own vehicle 10b is less than the threshold speed, the previously calculated road model is not corrected, but maintained, which enables more properly updating the road model.

D2. Other Modifications

The road model calculator 114b calculates a road model using surroundings information. In alternative embodiments, the road model calculator 114b may calculate a road model using not only surroundings information, but also a road model calculated at at least one second vehicle and acquired via vehicle-to-vehicle communications with the at least one second vehicle.

Figure 34:
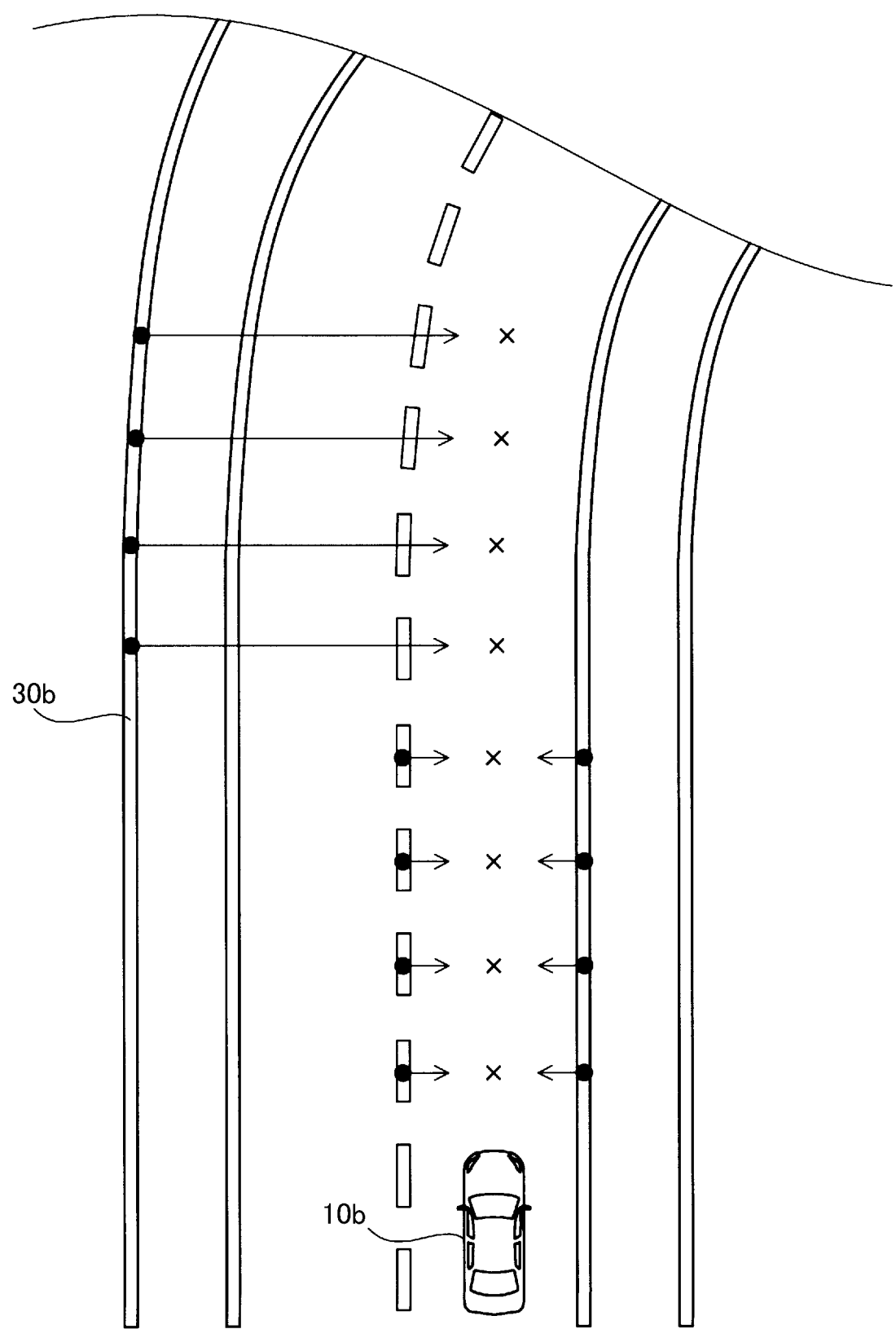
FIG. 34 is another example of a sequence of points.
Figure 35:
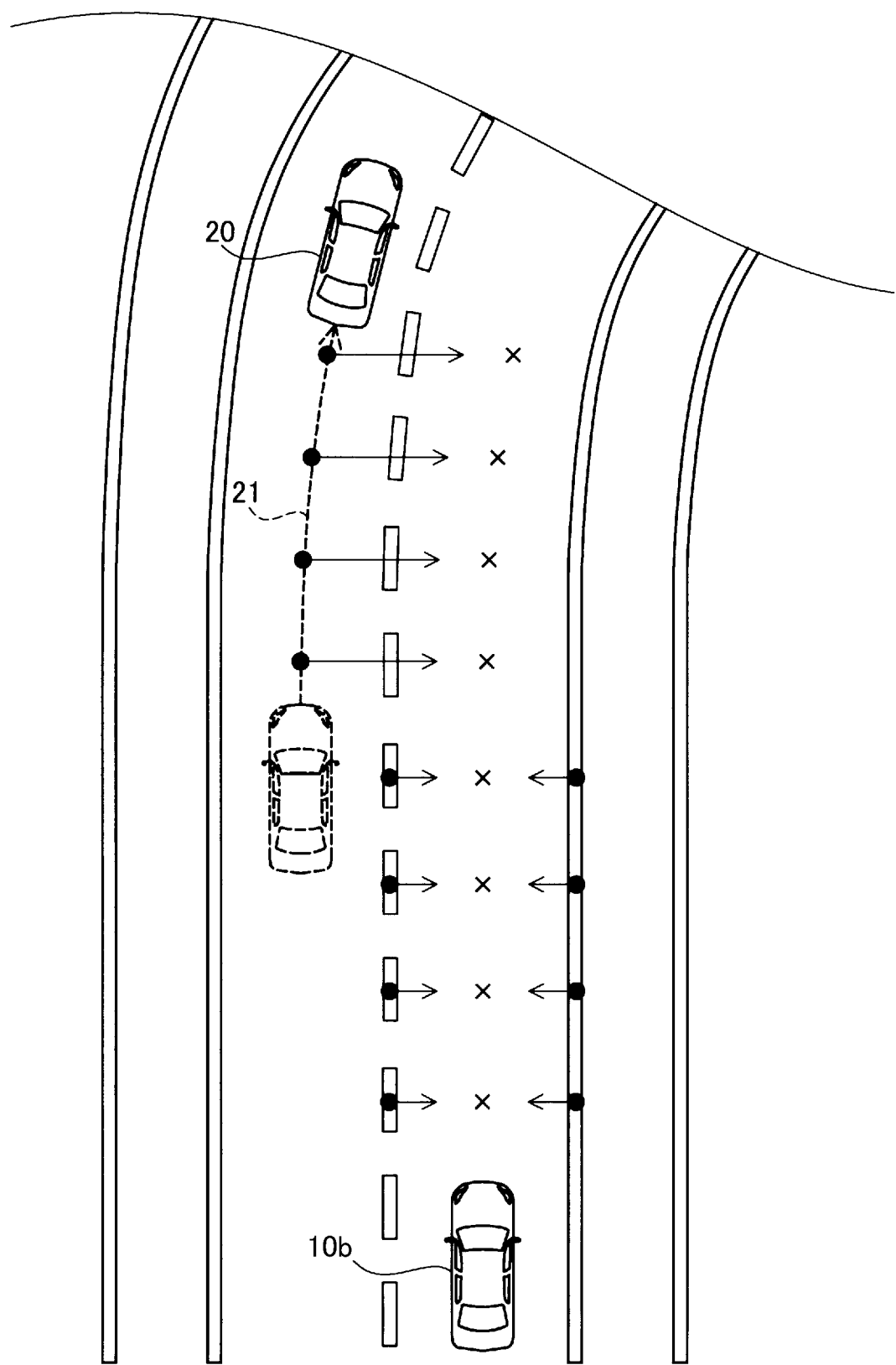
FIG. 35 is still another example of a sequence of points.

In the embodiments set forth above, the sequence-of-point estimator 112b is configured to estimate a sequence of points from shapes of lane divider lines on a road on which the own vehicle 10b is traveling. In alternative embodiments, the sequence-of-point estimator 112b may be configured to estimate a sequence of points from a combination of a shape of at least one lane divider line and a shape of at least one roadside object 30b, such as a wall, a guardrail or the like, as shown in FIG. 34, or from a combination of a shape of at least one lane divider line and a travel history 21 of at least one second vehicle 20, as shown in FIG. 35. Shapes of roadside objects 30b and travel histories 21 of second vehicles 20 are more recognizable far from the own vehicle 10b than shapes of lane divider lines. Therefore, combining shapes of lane divider lines with shapes of roadside objects 30b or histories 21 of second vehicles 20 enables calculating a high-accuracy road model even far from the own vehicle 10b. Recognition rates of travel histories 21 of preceding vehicles 20 and roadside objects 30b are liable to decrease as compared with shapes of lane divider lines. The previously calculated road model is maintained or corrected even if shapes of roadside objects 30b or travel histories 21 of preceding vehicles 20 are momentarily unrecognizable, which enables calculating a high-accuracy road model.

It should be appreciated that the present disclosure is not to be limited to the road shape recognition apparatus disclosed above and that the present disclosure can be implemented in numerous ways, such as a driving system including the road shape recognition apparatus disclosed above, a vehicle including the road shape recognition apparatus disclosed above, a road shape recognition method, a computer program for enabling a computer to function as the road shape recognition apparatus disclosed above, and a non-transitory computer readable storage medium storing such a program.

The present disclosure is not limited to any one of embodiments described above, but may be realized by various configurations within a scope not departing from the spirit of the disclosure. For example, the technical features in each embodiment, corresponding to the technical features of the aspects described in the specification may be replaced or combined as appropriate to solve a part or all of the above-described issues or to achieve a part or all of the above-described advantages. Unless the technical features are described as being an essential feature in the present specification, the technical features may be omitted as appropriate.

In the above-described embodiments and modifications, the control units and their methods described in the present disclosure may be implemented by a dedicated computer including a processor and a memory programmed to execute one or more functions embodied by computer programs. Alternatively, the control units and their methods described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

What is claimed is:

1. An apparatus for recognizing a road shape of a travel route of a first vehicle, the first vehicle being a vehicle equipped with the apparatus and a surroundings sensor including a camera, the apparatus comprising:
a surrounding environment recognizer configured to repeatedly acquire a result of detection by the surroundings sensor and recognize, as surroundings information, at least shapes of roadside objects or travel histories of second vehicles that are vehicles other than the first vehicle, located around the first vehicle in a travel direction of the first vehicle;
a sequence-of-point estimator configured to repeatedly estimate, using the surroundings information recognized by the surrounding environment recognizer, a reference line connecting a sequence of points that represent the road shape of the travel route in the travel direction of the first vehicle; and
a first lane boundary setter configured to repeatedly set a first lane boundary that is a boundary of a lane of the first vehicle, located at a first distance from the reference line, previously estimated by the sequence-of-point estimator, to a respective one of the left and the right of the first vehicle in a vehicle-widthwise direction of the first vehicle.

2. The apparatus according to claim 1, further comprising a to-be-excluded vehicle identifier configured to identify, using the travel histories of the second vehicles and first lane boundaries set by first lane boundary setter, a second vehicle, of the second vehicles located around the first vehicle in the travel direction of the first vehicle, whose travel history in the travel direction of the first vehicle does not follow the road shape of the travel route, as a first to-be-excluded vehicle,
wherein the reference line is estimated using the surroundings information having the travel history of the first to-be-excluded vehicle removed.

3. The apparatus according to claim 2, wherein
the to-be-excluded vehicle identifier is configured to identify a second vehicle, of the second vehicles located around the first vehicle in the travel direction of the first vehicle, as the first to-be-excluded vehicle when a travel history of the second vehicle in the travel direction of the first vehicle intersects at least one of the first lane boundaries set by first lane boundary setter within a predetermined second distance from the first vehicle in the travel direction of the first vehicle or when the second vehicle is straddling at least one of the first lane boundaries set by first lane boundary setter within the predetermined second distance from the first vehicle in the travel direction of the first vehicle.

4. The apparatus according to claim 3, wherein
a predetermined third distance is equal to or greater than the predetermined second distance,
a second vehicle, of the second vehicles located around the first vehicle in the travel direction of the first vehicle, which is located further than the predetermined third distance from the first vehicle in the travel direction of the first vehicle, is referred to as a first spaced-apart vehicle, and
the to-be-excluded vehicle identifier is configured to identify a first spaced-apart vehicle as the first to-be-excluded vehicle when a travel history of the first spaced-apart vehicle intersects at least one of the first lane boundaries set by the first lane boundary setter within the predetermined third distance from the first vehicle in the travel direction of the first vehicle, and withhold identifying a first spaced-apart vehicle as the first to-be-excluded vehicle when a travel history of the first spaced-apart vehicle intersects at least one of the first lane boundaries set by the first lane boundary setter further than the predetermined third distance from the first vehicle in the travel direction of the first vehicle.

5. The apparatus according to claim 3, further comprising a second lane boundary setter configured to set, for each of the first lane boundaries set by first lane boundary setter, a second lane boundary on an opposite side of the first lane boundary from the first vehicle,
wherein the second lane boundary setter is configured to acquire the travel histories of the second vehicles recognized by the surrounding environment recognizer, the first lane boundaries set by first lane boundary setter, and information about the first to-be-excluded vehicle identified by the to-be-excluded vehicle identifier, and for each of the first lane boundaries set by first lane boundary setter, when there is a travel history of the second vehicle that is not identified as the first to-be-excluded vehicle on the opposite side of the first lane boundary from the first vehicle, set the second lane boundary located at a predetermined fourth distance from the first lane boundary in the vehicle-widthwise direction of the first vehicle on the opposite side of the first lane boundary from the first vehicle.

6. The apparatus according to claim 3, further comprising a second lane boundary setter configured to set, for each of the first lane boundaries set by first lane boundary setter, a second lane boundary on an opposite side of the first lane boundary from the first vehicle,
wherein the second lane boundary setter is configured to acquire the surroundings information recognized by the surrounding environment recognizer and the first lane boundaries set by first lane boundary setter, and for each of the first lane boundaries set by first lane boundary setter, when there is a lane divider line recognized by the surrounding environment recognizer on an opposite side of the first lane boundary from the first vehicle, set the second lane boundary located at a predetermined fourth distance from the first lane boundary in the vehicle-widthwise direction of the first vehicle on the opposite side of the first lane boundary from the first vehicle where there is the lane divider line recognized by the surrounding environment recognizer.

7. The apparatus according to claim 5, wherein
the second lane boundary setter is configured to, for each of second lane boundaries set by the second lane boundary setter, when there is a travel history of the second vehicle on an opposite side of the second lane boundary from the first lane boundary, set another second lane boundary located at the predetermined fourth distance from the second lane boundary in the vehicle-widthwise direction of the first vehicle on the opposite side of the second lane boundary from the first lane boundary where there is the travel history of the second vehicle.

8. The apparatus according to claim 5, wherein
the second lane boundary setter is configured to, for each of second lane boundaries set by the second lane boundary setter, when there is a lane divider line recognized by the surrounding environment recognizer on an opposite side of the second lane boundary from the first lane boundary, set another second lane boundary located at the predetermined fourth distance from the second lane boundary in the vehicle-widthwise direction of the first vehicle on the opposite side of the second lane boundary from the first vehicle where there is the lane divider line recognized by the surrounding environment recognizer.

9. The apparatus according to claim 5, wherein
the to-be-excluded vehicle identifier is further configured to identify, using the travel histories of the second vehicles and second lane boundaries set by second lane boundary setter, a second vehicle, of the second vehicles located around the first vehicle in the travel direction of the first vehicle, whose travel history does not follow the road shape of the travel route, as a second to-be-excluded vehicle, and
reference line is estimated using the surroundings information having the travel history of the second to-be-excluded vehicle removed.

10. The apparatus according to claim 9, wherein
the to-be-excluded vehicle identifier is configured to identify a second vehicle, of the second vehicles located around the first vehicle in the travel direction of the first vehicle, as the second to-be-excluded vehicle when a travel history of the second vehicle in the travel direction of the first vehicle intersects at least one of the second lane boundaries set by second lane boundary setter within the predetermined second distance from the first vehicle in the travel direction of the first vehicle or when the second vehicle is straddling at least one of the second lane boundaries set by second lane boundary setter within the predetermined second distance from the first vehicle in the travel direction of the first vehicle.

11. The apparatus according to claim 10, wherein
a predetermined fifth distance is greater than the predetermined second distance,
a second vehicle, of the second vehicles located around the first vehicle in the travel direction of the first vehicle, which is located further than the predetermined fifth distance from the first vehicle in the travel direction of the first vehicle, is referred to as a second spaced-apart vehicle, and
the to-be-excluded vehicle identifier is configured to identify a second spaced-apart vehicle as the second to-be-excluded vehicle when a travel history of the second spaced-apart vehicle intersects at least one of the second lane boundaries set by the second lane boundary setter within the predetermined fifth distance from the first vehicle in the travel direction of the first vehicle, and withhold identifying the second spaced-apart vehicle as the second to-be-excluded vehicle when a travel history of the second spaced-apart vehicle intersects at least one of the second lane boundaries set by second lane boundary setter further than the predetermined fifth distance from the first vehicle in the travel direction of the first vehicle.

12. An apparatus for recognizing a road shape of a travel route of a first vehicle, the first vehicle being a vehicle equipped with the apparatus and a surroundings sensor, the apparatus comprising:
a surrounding environment recognizer configured to repeatedly acquire a result of detection by the surroundings sensor and recognize, as surroundings information, at least shapes of lane divider lines on a road, shapes of roadside objects, or travel histories of second vehicles that are vehicles other than the first vehicle, located around the first vehicle in a travel direction of the first vehicle;
a sequence-of-point estimator configured to repeatedly estimate, using the surroundings information, a sequence of points representing the road shape of the travel route;
a recognition distance determiner configured to repeatedly determine a distance from the first vehicle to a most-distant point of the sequence of points estimated by the sequence-of-point estimator as a recognition distance; and
a road model calculator configured to repeatedly calculate, using the surroundings information, a road model that represents the road shape with a continuous line,
wherein the road model calculator is configured to, when a difference between the recognition distance and a previously determined recognition distance is equal to or less than a predetermined threshold distance, update a previously calculated road model to a currently calculated road model, and when the difference between the recognition distance and the previously determined recognition distance is greater than the predetermined threshold distance, withhold updating the previously calculated road model.

13. An apparatus for recognizing a road shape of a travel route of a first vehicle, the first vehicle being a vehicle equipped with the apparatus, a surroundings sensor, and a vehicle state sensor, the apparatus comprising:
a surrounding environment recognizer configured to repeatedly acquire a result of detection by the surroundings sensor and recognize, as surroundings information, at least shapes of lane divider lines on a road, shapes of roadside objects, or travel histories of second vehicles that are vehicles other than the first vehicle, located around the first vehicle in a travel direction of the first vehicle;
a sequence-of-point estimator configured to repeatedly estimate, using the surroundings information, a sequence of points representing the road shape of the travel route;
a recognition distance determiner configured to repeatedly determine a distance from the first vehicle to a most-distant point of the sequence of points estimated by the sequence-of-point estimator as a recognition distance; and
a road model calculator configured to repeatedly calculate, using the surroundings information, a road model that represents the road shape with a continuous line,
wherein the road model calculator is configured to, when a difference between the recognition distance and a previously determined recognition distance is equal to or less than a predetermined threshold distance, update a previously calculated road model to a currently calculated road model, and when the difference between the recognition distance and the previously determined recognition distance is greater than the predetermined threshold distance, correct the previously calculated road model using at least a travel speed and a yaw rate of the first vehicle detected by the vehicle state sensor.

14. An apparatus for recognizing a road shape of a travel route of a first vehicle, the first vehicle being a vehicle equipped with the apparatus, a surroundings sensor, and a vehicle state sensor, the apparatus comprising:
    a surrounding environment recognizer configured to repeatedly acquire a result of detection by the surroundings sensor and recognize, as surroundings information, at least shapes of lane divider lines on a road, shapes of roadside objects, or travel histories of second vehicles that are vehicles other than the first vehicle, located around the first vehicle in a travel direction of the first vehicle;
    a sequence-of-point estimator configured to repeatedly estimate, using the surroundings information, a sequence of points representing a road shape that is the road shape of the travel route;
    a recognition distance determiner configured to repeatedly determine a distance from the first vehicle to a most-distant point of the sequence of points estimated by the sequence-of-point estimator as a recognition distance; and
    a road model calculator configured to repeatedly calculate, using the surroundings information, a road model that represents the road shape with a continuous line,
    wherein the road model calculator is configured to, when a difference between the recognition distance and a previously determined recognition distance is equal to or less than a predetermined threshold distance, update a previously calculated road model to a currently calculated road model, when the difference between the recognition distance and a previously determined recognition distance is greater than the predetermined threshold distance and a travel speed of the first vehicle detected by the vehicle state sensor is less than a predetermined travel speed, withhold updating the previously calculated road model, and when the difference between the recognition distance and a previously determined recognition distance is greater than the predetermined threshold distance and the travel speed of the first vehicle detected by the vehicle state sensor is equal to or greater than the predetermined travel speed, correct the previously calculated road model using at least the travel speed and a yaw rate of the first vehicle detected by the vehicle state sensor.

15. The apparatus according to claim 12, wherein the recognition distance determiner is further configured to, when the difference between the recognition distance and the previously determined recognition distance is greater than the predetermined threshold distance, update the recognition distance to the previously determined recognition distance minus a distance that the first vehicle has travelled since when the previously determined recognition distance was determined.

16. A method for recognizing a road shape of a travel route of a first vehicle, the first vehicle being a vehicle equipped with a surroundings sensor including a camera, the method comprising:
    repeatedly acquiring a result of detection by the surroundings sensor and recognizing, as surroundings information, at least shapes of roadside objects or travel histories of second vehicles that are vehicles other than the first vehicle, located around the first vehicle in a travel direction of the first vehicle;
    repeatedly estimating, using the surroundings information, a reference line connecting a sequence of points that represent the road shape of the travel route in the travel direction of the first vehicle; and
    repeatedly setting a first lane boundary that is a boundary of a lane of the first vehicle, located at a first distance from the reference line, that was previously estimated, as to a respective one of the left and the right of the first vehicle in a vehicle-widthwise direction of the first vehicle.

17. A method for recognizing a road shape of a travel route of a first vehicle, the first vehicle being a vehicle equipped with a surroundings sensor, the method comprising:
    repeatedly acquiring a result of detection by the surroundings sensor and recognizing, as surroundings information, at least shapes of lane divider lines on a road, shapes of roadside objects, or travel histories of second vehicles that are vehicles other than the first vehicle, located around the first vehicle in a travel direction of the first vehicle;
    repeatedly estimating, using the surroundings information, a sequence of points representing the road shape of the travel route;
    repeatedly determining a distance from the first vehicle to a most-distant point of the sequence of points estimated, as a recognition distance; and
    repeatedly calculating, using the surroundings information, a road model that represents the road shape with a continuous line,
    wherein the repeatedly calculating the road model comprises updating a previously calculated road model to a currently calculated road model for a state in which a difference between the recognition distance and a previously determined recognition distance is equal to or less than a predetermined threshold distance, and withholding updating the previously calculated road model for a state in which gate the difference between the recognition distance and the previously determined recognition distance is greater than the predetermined threshold distance.

* * * * *